US009001895B2

(12) United States Patent
Ohta et al.

(10) Patent No.: US 9,001,895 B2
(45) Date of Patent: Apr. 7, 2015

(54) IMAGE DISPLAY DEVICE AND IMAGE PROCESSING DEVICE

(75) Inventors: Yoshihito Ohta, Osaka (JP); Tomoko Morita, Osaka (JP); Yutaka Nio, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 3 days.

(21) Appl. No.: 14/122,811

(22) PCT Filed: Feb. 16, 2012

(86) PCT No.: PCT/JP2012/001007
§ 371 (c)(1),
(2), (4) Date: Nov. 27, 2013

(87) PCT Pub. No.: WO2012/169096
PCT Pub. Date: Dec. 13, 2012

(65) Prior Publication Data
US 2014/0112646 A1  Apr. 24, 2014

(30) Foreign Application Priority Data
Jun. 8, 2011  (JP) ................................ 2011-128258

(51) Int. Cl.
*H04N 7/12* (2006.01)
*H04N 9/80* (2006.01)
(Continued)

(52) U.S. Cl.
CPC .. *H04N 9/80* (2013.01); *G09G 5/00* (2013.01); *H04N 7/014* (2013.01); *G09G 2320/106* (2013.01); *G09G 2340/0435* (2013.01); *G09G 2340/10* (2013.01)

(58) Field of Classification Search
CPC .................. G06T 3/4007; G06T 2207/10016; H04B 1/66

USPC ........ 375/240.21, 240.27, 241; 348/699, 538, 348/701; 386/230, 271, 353
See application file for complete search history.

(56) References Cited

U.S. PATENT DOCUMENTS 5,614,957 A * 3/1997 Boyce et al. ................... 348/567
6,442,327 B1 * 8/2002 Yamada et al. ............... 386/230
(Continued)

FOREIGN PATENT DOCUMENTS

JP     2919211      7/1999
JP     11-328862    11/1999
(Continued)

OTHER PUBLICATIONS

International Search Report issued May 22, 2012 in International (PCT) Application No. PCT/JP2012/001007.

*Primary Examiner* — Helen Shibru
(74) *Attorney, Agent, or Firm* — Wenderoth, Lind & Ponack, L.L.P.

(57) ABSTRACT

An image display device includes: an interpolation phase generator that generates an interpolation phase on the basis of downsampling frame information representing a downsampling timing at which at least one frame image of the image signal is thinned, and an interpolation frame generator that generates an interpolation frame image corresponding to the interpolation phase. The interpolation phase generator generates the interpolation phase such that a phase distance between a first interpolation frame image from among a plurality of interpolation frame images within one period of downsampling periods, and a second interpolation frame image that follows the first interpolation frame image becomes equal to a phase distance between mutually adjacent interpolation frame images obtained when phase distances between a plurality of interpolation frame images are equalized within one period of the downsampling periods.

9 Claims, 23 Drawing Sheets

(51) Int. Cl.
  *G09G 5/00*  (2006.01)
  *H04N 7/01*  (2006.01)

(56) References Cited

U.S. PATENT DOCUMENTS

| | | | | |
|---|---|---|---|---|
| 6,618,443 | B1* | 9/2003 | Kim et al. | 375/240.21 |
| 8,428,364 | B2* | 4/2013 | Liu et al. | 382/199 |
| 8,520,139 | B2* | 8/2013 | Imaida | 348/441 |
| 2006/0008003 | A1* | 1/2006 | Ji et al. | 375/240.11 |
| 2006/0146931 | A1* | 7/2006 | Boyce | 375/240.08 |
| 2007/0195887 | A1* | 8/2007 | Comer | 375/240.21 |
| 2008/0019445 | A1 | 1/2008 | Aono et al. | |
| 2008/0130754 | A1* | 6/2008 | Winger | 375/240.21 |
| 2008/0232667 | A1* | 9/2008 | Kitamura et al. | 382/132 |
| 2010/0026898 | A1 | 2/2010 | Ueno et al. | |
| 2012/0141042 | A1* | 6/2012 | Iketani | 382/238 |
| 2013/0063623 | A1* | 3/2013 | Kawaguchi et al. | 348/224.1 |

FOREIGN PATENT DOCUMENTS

| | | |
|---|---|---|
| JP | 3495485 | 2/2004 |
| JP | 2006-94261 | 4/2006 |
| JP | 2008-90176 | 4/2008 |
| JP | 4416796 | 2/2010 |

* cited by examiner

IMAGE DISPLAY DEVICE AND IMAGE PROCESSING DEVICE

TECHNICAL FIELD

The present invention relates to an image display device and an image processing device that correct an image signal in which at least one frame image has been periodically thinned from among a plurality of temporally consecutive frame images.

BACKGROUND ART

A reproduction device reproducing image signals from optical disks such as DVD or BD (Blu-ray Disc) is known. In the conventional reproduction device, data are reproduced in block units constituted by data in a plurality of frame units, the reproduction rate of data in block units is controlled, and data in frame units are omitted, from among the data in block units according to the controlled reproduction rate (see, for example, Patent Literature 1).

The reproduction device also outputs the reproduced data, in which some of the data in frame units have been thinned, to an image display device such as a liquid crystal display or a plasma display, and the image display device displays the inputted reproduced data.

By so thinning some of the reproduced data, it is possible to display the data at an apparently high rate.

However, in the conventional image display device, the reproduced data downsampled in frame units in the reproduction device are displayed as they are. For this reason, motion is not accurately reproduced, and the viewer can have a sense of visual discomfort.

FIG. 23 shows an example of the reproduced image signal reproduced by the reproduction device and the downsampled image signal outputted from the reproduction device. FIG. 23 illustrates a case in which one frame image is thinned from among four frame images. FIG. 23 shows how a round image moves as a constant speed from the left to the right on the screen. A frame image F4 is thinned from among the frame images F1 to F6 constituting the reproduced video signal. As a result, the downsampled image signal is constituted by frame images F1 to F3, F5, and F6.

As shown in FIG. 23, when a frame image is divided into a plurality of blocks according to the size of the round image, in the reproduced image signal, the round image moves rightward by one block at a time, but in the downsampled image signal, the round image moves by two blocks between the frame image F3 and the frame image F5 and the motion becomes discontinuous.

Thus, when a frame image is thinned in the reproduction device, the image displayed in the image display device becomes discontinuous, and the viewer can have a sense of visual discomfort.

CITATION LIST

Patent Literature

Patent Literature 1: Japanese Patent Application Publication No. 11-328862

SUMMARY OF THE INVENTION

The present invention has been created to resolve the problem, and it is an objective of the present invention to provide an image display device and an image processing device that can smooth the movement of an image and improve a sense of visual discomfort.

An image display device according to one aspect of the present invention includes: an image signal acquirer that acquires an image signal in which at least one frame image has been periodically thinned from among a plurality of temporally consecutive frame images; a motion vector detector that detects a motion vector of the present frame image by using at least two or more temporally adjacent frame images; an interpolation phase generator that generates an interpolation phase of an interpolation frame image on the basis of downsampling frame information representing a downsampling timing at which the at least one frame image of the image signal acquired by the image signal acquirer is thinned; an interpolation frame generator that generates an interpolation frame image corresponding to the interpolation phase generated by the interpolation phase generator, on the basis of the image signal acquired by the image signal acquirer and the motion vector detected by the motion vector detector; and a display that displays an image signal including the interpolation frame image generated by the interpolation frame generator, wherein the interpolation phase generator generates the interpolation phase such that a phase distance between a first interpolation frame image from among a plurality of interpolation frame images within one period of downsampling periods in which at least one frame image is thinned from among the plurality of frame images, and a second interpolation frame image that follows the first interpolation frame image becomes equal to a phase distance between mutually adjacent interpolation frame images obtained when phase distances between a plurality of interpolation frame images are equalized within one period of the downsampling periods.

With such a configuration, the image signal in which at least one frame image has been periodically thinned from a plurality of temporally consecutive frame images is acquired by the image signal acquirer. The motion vector of the present frame image is detected by the motion vector detector by using at least two or more temporally adjacent frame images. The interpolation phase of an interpolation frame image is generated by the interpolation phase generator on the basis of downsampling frame information representing a downsampling timing at which the at least one frame image of the acquired image signal is sampled. The interpolation frame image corresponding to the generated interpolation phase is generated by the interpolation frame generator on the basis of the acquired image signal and the detected motion vector. The image signal including the generated interpolation frame image is displayed by the display. The interpolation phase is generated by the interpolation phase generator such that a phase distance between the first interpolation frame image from among a plurality of interpolation frame images within one period of downsampling periods in which at least one frame image is thinned from among the plurality of frame images, and the second interpolation frame image that follows the first interpolation frame image becomes equal to a phase distance between mutually adjacent interpolation frame images attained when phase distances between a plurality of interpolation frame images are equalized within one period of the downsampling periods.

In accordance with the present invention, a phase distance between the first interpolation frame image from among a plurality of interpolation frame images within one period of downsampling periods, and the second interpolation frame image that follows the first interpolation frame image becomes equal to a phase distance between mutually adjacent interpolation frame images attained when phase distances between a plurality of interpolation frame images are equalized within one period of the downsampling periods. Therefore, the first interpolation frame image and the second interpolation frame image are displayed consecutively, the motion of the image can be smoothed, and a sense of visual discomfort can be improved.

Objectives, features, and merits of the present invention are made more apparent by the following detailed explanation and appended drawings.

DESCRIPTION OF EMBODIMENTS

Embodiments of the present invention are described below with reference to the appended drawings. The embodiments described below are specific examples of the present invention and place no limitation on the technical scope of the present invention.

Embodiment 1

Figure 1:
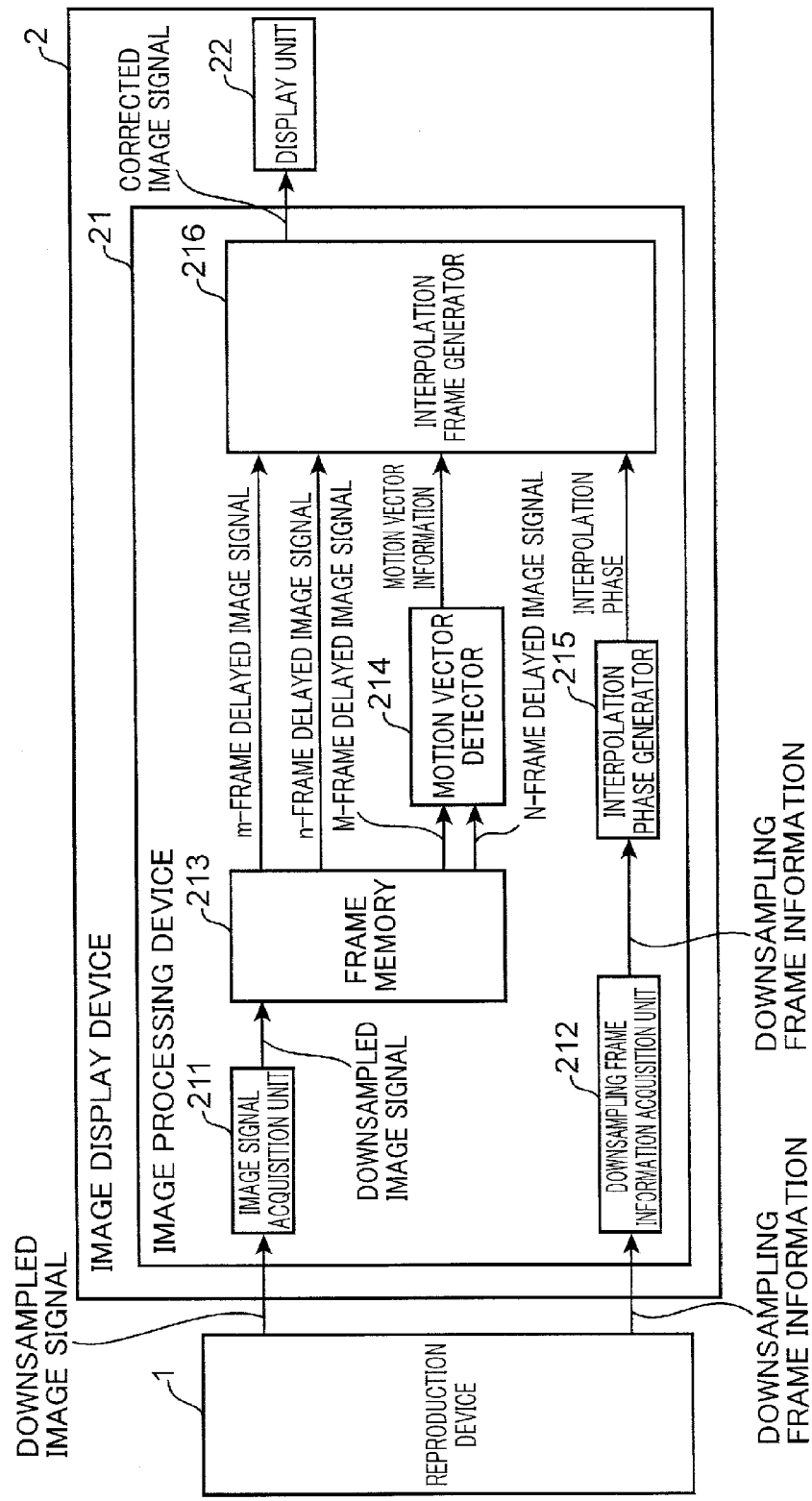
FIG. 1 illustrates the configuration of the image display device of Embodiment 1 of the present invention.

FIG. 1 illustrates the configuration of the image display device in Embodiment 1 of the present invention. A reproduction device 1 shown in FIG. 1 reproduces image signals from an optical disk, for example, CD, DVD, or BD. The reproduction device 1 produces a downsampled image signal in which at least one frame image is periodically thinned from a plurality of temporally consecutive frame images on the basis of the reproduced image signals. The reproduction device 1 outputs the produced image signal to an image display device 2. The reproduction device 1 also reproduces from the optical disk downsampling frame information representing a downsampling timing at which at least one frame image of the image signal is sampled. The reproduction device 1 outputs the reproduced downsampling frame information to the image display device 2.

The reproduction device 1 may be provided, for example, with a tuner for TV broadcasting, image input terminals, or network connection terminals, and may receive the image signal and produce the downsampled image signal from the received image signal.

The image display device 2 shown in FIG. 1 is provided with an image processing device 21 and a display unit 22. The image processing device 21 is provided with an image signal acquisition unit 211, a downsampling frame information acquisition unit 212, a frame memory 213, a motion vector detector 214, an interpolation phase generator 215, and an interpolation frame generator 216.

The image signal acquisition unit 211 acquires from the reproduction device 1 the downsampled image signal in which at least one frame image is periodically thinned from a plurality of temporally consecutive frame images. The image signal acquisition unit 211 outputs the acquired downsampled image signal to the frame memory 213.

The downsampling frame information acquisition unit 212 acquires from the reproduction device 1 downsampling frame information representing the downsampling timing at which at least one frame image of the downsampled image signal acquired by the image signal acquisition unit 211 is thinned. The downsampling frame information acquisition unit 212 outputs the acquired downsampling frame information to the interpolation phase generator 215.

The frame memory 213 stores, in frame units, the downsampled image signal acquired by the image signal acquisition unit 211. The frame memory 213 outputs an M-frame delayed image signal and an N-frame delayed image signal to the motion vector detector 214, and outputs an m-frame delayed image signal and an n-frame delayed image signal to the interpolation frame generator 216. The M-frame delayed image signal represents an image signal delayed, for example, by 0 frames, the N-frame delayed image signal represents an image signal delayed, for example, by 1 frame (M+1 frames), the m-frame delayed image signal represents an image signal delayed, for example, by 1 frame (M+1 frames) or 0 frames (M-frames), and the n-frame delayed image signal represents an image signal delayed, for example, by 2 frames (N+1 frames) or 1 frame (N-frames).

The motion vector detector 214 detects the motion vector of the present frame image by using at least two or more temporally adjacent frame images. The motion vector detector 214 inputs two temporally consecutive frame image data, for example, image data of frame M and image data of frame M+1 (here M is integer). The motion vector detector 214 detects the motion vector for each pixel of the frame M by detecting the amount of motion between those frames, and outputs the detected motion vectors to the interpolation frame generator 216. The conventional motion vector detection method can be used. For example, a detection method using block matching processing can be used.

The interpolation phase generator 215 generates the interpolation phase of interpolation frame images generated by using two adjacent frame images from among a plurality of frame images on the basis of the downsampling frame information acquired by the downsampling frame information acquisition unit 212. The interpolation phase generator 215 generates the interpolation phase such that a phase distance between a leading first interpolation frame image from among a plurality of interpolation frame images within one period of downsampling periods in which at least one frame image is thinned from among a plurality of frame images, and a second interpolation frame image that follows the first interpolation frame image becomes equal to a phase distance between mutually adjacent interpolation frame images attained when phase distances between a plurality of interpolation frame images are equalized within one period of the downsampling periods.

The interpolation frame generator 216 generates an interpolation frame image corresponding to the interpolation phase, which has been generated by the interpolation phase generator 215, on the basis of the downsampled image signal acquired by the image signal acquisition unit 211 and the motion vector detected by the motion vector detector 214.

The display unit 22 displays the corrected image signal including the interpolation frame image generated by the interpolation frame generator 216.

The operation of the image display device 2 shown in FIG. 1 is explained below. Initially explained is the processing of correcting a downsampled image signal obtained by thinning one frame image from among four frame images within one period of downsampling periods, that is, the downsampled image signal with a downsampling period of 1/4, and displaying the corrected image signal.

Figure 2:
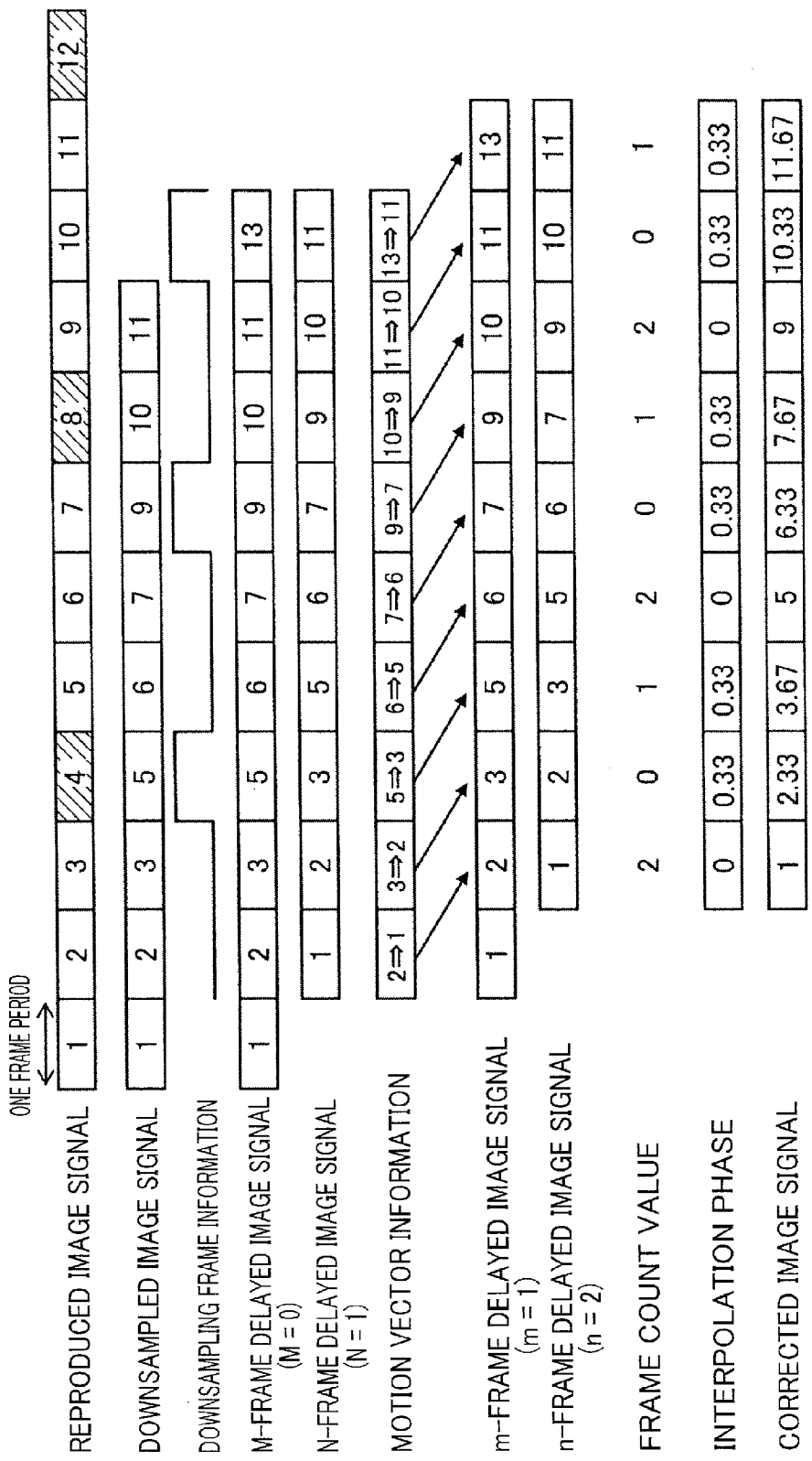
FIG. 2 is a timing chart for explaining the processing of correcting the downsampled image signal with a downsampling period of 1/4 in Embodiment 1.

FIG. 2 is a timing chart for explaining the processing of correcting the downsampled image signal with a downsampling period of 1/4 in Embodiment 1. The digits in the reproduced image signal, downsampled image signal, M-frame delayed image signal, N-frame delayed image signal, m-frame delayed image signal, and n-frame delayed image signal represent frame numbers.

The reproduced image signal shown in FIG. 2 represents a reproduced image signal reproduced by the reproduction device 1, and the downsampled image signal represents a downsampled image signal outputted from the reproduction device 1. The image signal acquisition unit 211 acquires an image signal in which one frame image has been thinned from among four frame images within one period of downsampling periods. In the downsampled image signal, frame images with the frame numbers "4", "8", and "12" have been omitted. Thus, the fourth frame image has been thinned from among the first to fourth consecutive frame images within one period of downsampling periods.

The downsampling frame information represents information acquired by the downsampling frame information acquisition unit 212 and inputted to the interpolation phase generator 215. The downsampling frame information is a pulse signal representing the downsampling timing at which the frame image has been thinned, and has a high level "1" when the frame image has been thinned and a low level "0" when the frame image has not been thinned. The downsampling frame information shown in FIG. 2 has the high level "1" at timings at which frame images with frame numbers "5", "9", and "13" of the downsampled image signal are outputted.

Further, the M-frame delayed image signal represents an image signal delayed, for example, by 0 frames, the N-frame delayed image signal represents an image signal delayed, for example, by 1 frame (M+1 frames), the m-frame delayed image signal represents an image signal delayed, for example, by 1 frame (M+1 frames), and the n-frame delayed image signal represents an image signal delayed, for example, by 2 frames (N+1 frames). The M-frame delayed image signal represents an image signal that has not been delayed and is identical to the downsampled image signal.

In the present embodiment, the interpolation frame image is generated after the motion vector information on one frame image has been entirely calculated. Therefore, the M-frame delayed image signal, N-frame delayed image signal, m-frame delayed image signal, and n-frame delayed image signal satisfy the conditions m=M+1 and n=N+1.

The motion vector information represents the frame number of the frame image for which the motion vector is to be calculated and the frame number of the frame image that is referred to when the motion vector is calculated. The motion vector detector 214 detects the motion vector by using the M-frame delayed image signal and the N-frame delayed image signal outputted from the frame memory 213.

The interpolation phase generator 215 includes a frame counter that counts the number of frame images after the frame image has been thinned. The frame count value that is counted by the frame counter changes correspondingly to the downsampling frame information. The frame count value is reset to 0 when the downsampling frame information has a high level "1", and incremented when the downsampling frame information has a low level "0".

The interpolation phase represents the position at which the interpolation frame image is generated between two adjacent images when the distance between the two adjacent images is taken as 1 within one frame period representing the period in which one frame image is displayed. A table in which the frame count values and interpolation phases are associated with each other has been stored in advance in the interpolation phase generator 215. The interpolation phase "0" is associated with the frame count value "2", and the interpolation phase "0.33" is associated with the frame count values "1" and "0". The interpolation phase generator 215 refers to the table and selects the interpolation phase corresponding to the frame count value of the frame counter.

The interpolation phase generator 215 generates the interpolation phase such that a phase distance between a leading first interpolation frame image from among a plurality of interpolation frame images within one period of downsampling periods and a second interpolation frame image that follows the first interpolation frame image becomes equal to a phase distance between mutually adjacent interpolation frame images attained when phase distances between a plurality of interpolation frame images are equalized within one period of downsampling periods. Further, the interpolation phase generator 215 generates the interpolation phase such as to equalize the phase distances between the three interpolation frame images within one period of downsampling periods.

For example, the interpolation phase corresponding to the first interpolation frame image is "0", the interpolation phase corresponding to the second interpolation frame image is "0.33", and the interpolation phase corresponding to the third interpolation frame image is 0.33".

The corrected image signal represents a corrected output image signal including the interpolation frame image generated by the interpolation frame generator 216. As shown in FIG. 2, the interpolation frame generator 216 generates an interpolation frame image corresponding to the interpolation phase on the basis of the m-frame delayed image signal and the n-frame delayed image signal outputted from the frame memory 213 and the motion vector detected by the motion vector detector 214.

Since the interpolation phase corresponding to the first interpolation frame image is "0", the first frame image of the n-frame delayed image signal is outputted as the first interpolation frame image. Since the interpolation phase corresponding to the second interpolation frame image is "0.33", the interpolation frame image at a position corresponding to "2.33" between the second frame image of the n-frame delayed image signal and the third frame image of the m-frame delayed image signal is outputted as the second interpolation frame image. Since the interpolation phase corresponding to the third interpolation frame image is "0.33", the interpolation frame image at a position corresponding to "3.67" between the third frame image of the n-frame delayed image signal and the fifth frame image of the m-frame delayed image signal is outputted as the third interpolation frame image. The first to third interpolation frame images are outputted in each period.

Figure 3:
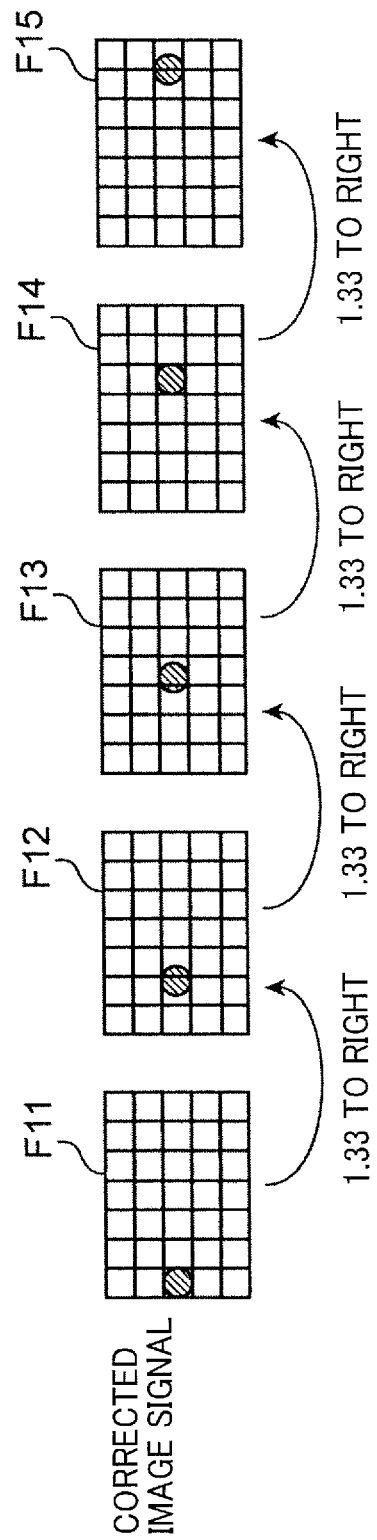
FIG. 3 illustrates an example of the corrected image signal displayed on the display unit.
Figure 23:
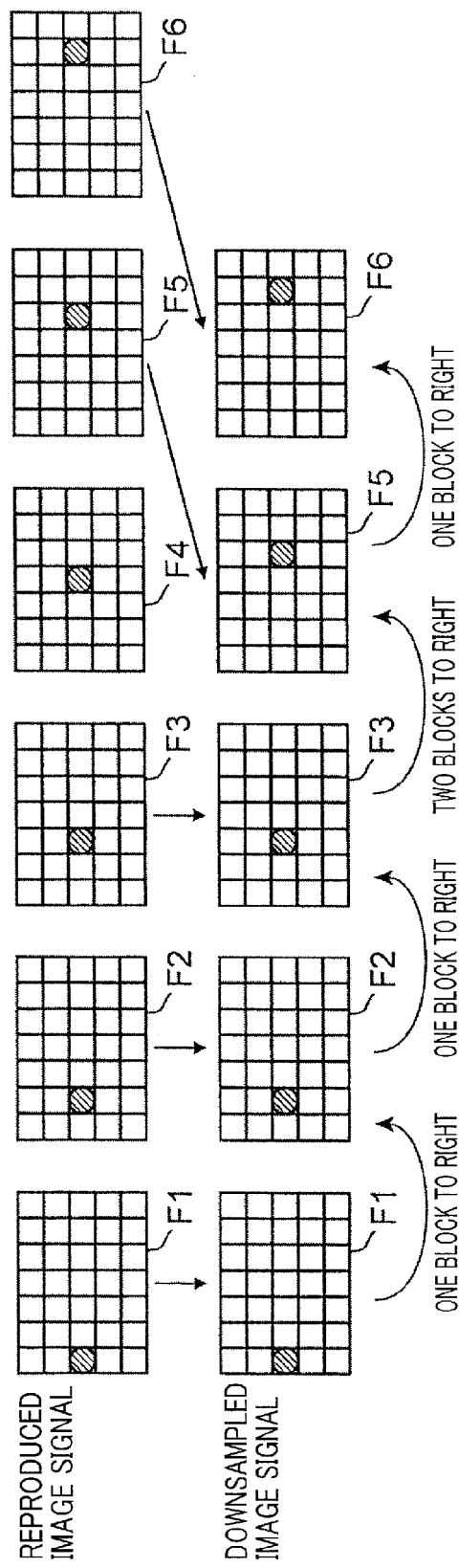
FIG. 23 shows an example of the reproduced image signal reproduced by the reproduction device and the downsampled image signal outputted from the reproduction device.

FIG. 3 shows an example of the corrected image signal displayed by the display unit. The corrected image signal shown in FIG. 3 illustrates an example obtained by correcting the downsampled image signal shown in FIG. 23 that represents how a round image moves at the same speed from the left to the right on the screen.

As shown in FIG. 3, the corrected image signal is constituted by frame images F11 to F15. In the frame images F11 to F15, the round image moves to the right by 1.33 blocks. Therefore, the round image moves continuously, rather than discontinuously as shown by the downsampled image signal in FIG. 23, and visual discomfort can be eliminated.

Further, in the present embodiment, the interpolation frame image is generated after the motion vector information on one frame image has been entirely calculated, but the present invention is not limited to such a configuration, and the interpolation frame image may be generated while the motion vector information is being calculated.

Figure 4:
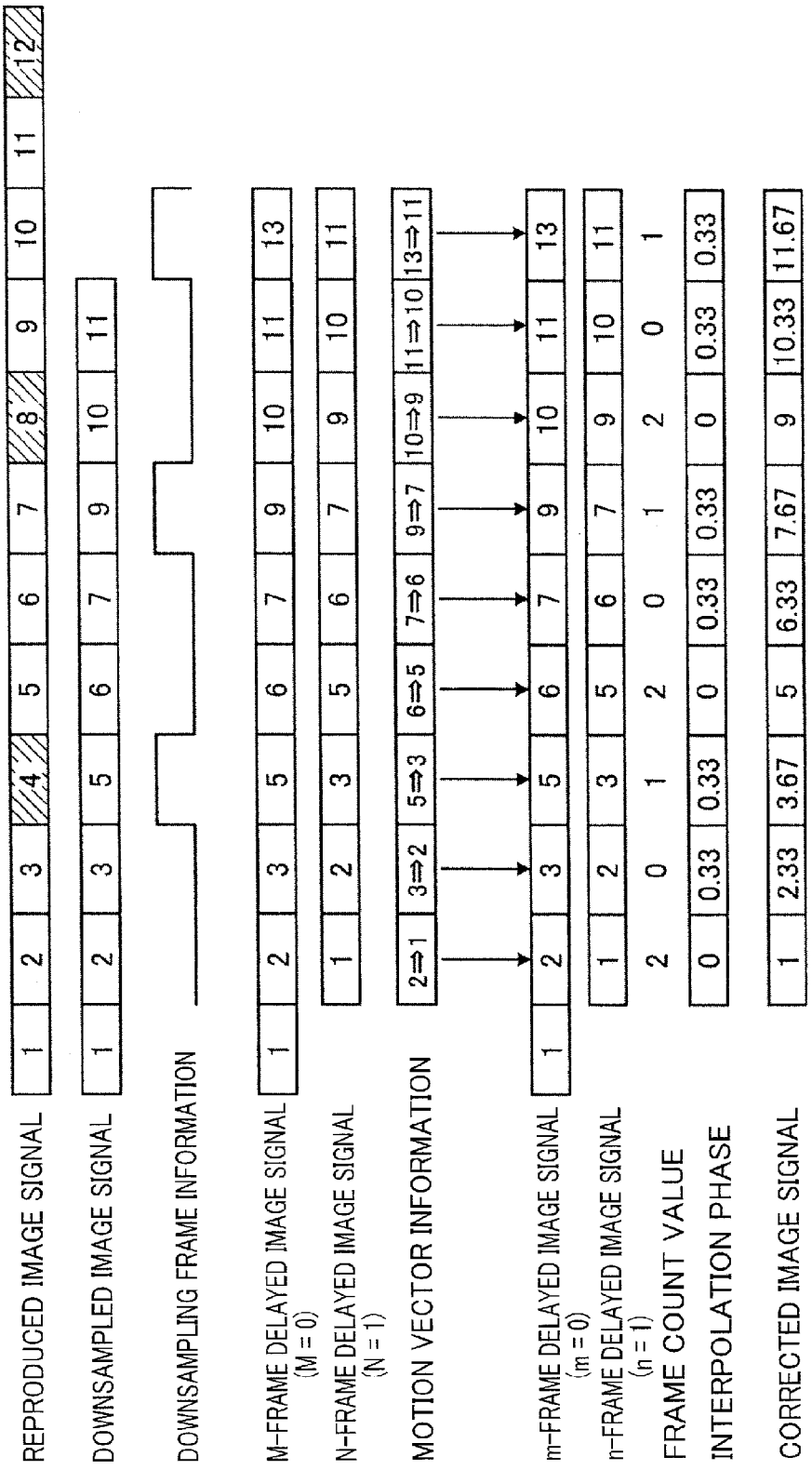
FIG. 4 is a timing chart for explaining the processing of correcting the downsampled image signal with a downsampling period of 1/4 while calculating the motion vector information.

FIG. 4 is a timing chart for explaining the processing of correcting the downsampled image signal for which the downsampling period is 1/4, while calculating the motion vector information. Only the processing different from that illustrated by FIG. 2 is explained herein.

The frame memory 213 outputs an m-frame delayed image signal at a timing same as that of the M-frame delayed image signal, and outputs an n-frame delayed image signal at a timing same as that of the N-frame delayed image signal. Thus, in the timing chart shown in FIG. 2, the interpolation frame image is generated after the entire motion vector information on one frame image has been calculated. Therefore, the m-frame delayed image signal and the n-frame delayed image signal used when the interpolation frame image is generated are delayed by one frame with respect to the M-frame delayed image signal and the N-frame delayed image signal used when the motion vector information is calculated.

Meanwhile, in the timing chart shown in FIG. 4, the interpolation frame image is generated, while calculating the motion vector information. Therefore, the m-frame delayed image signal and the n-frame delayed image signal used when the interpolation frame image is generated are at the same timing as the M-frame delayed image signal and the N-frame delayed image signal used when the motion vector information is generated.

As a result, the interpolation frame generator 216 can generate the interpolation frame image while calculating the motion vector information.

Further, in the present embodiment, the case in which the downsampling period is constant is explained, but the downsampling period can be disturbed for some reason or other.

Figure 5:
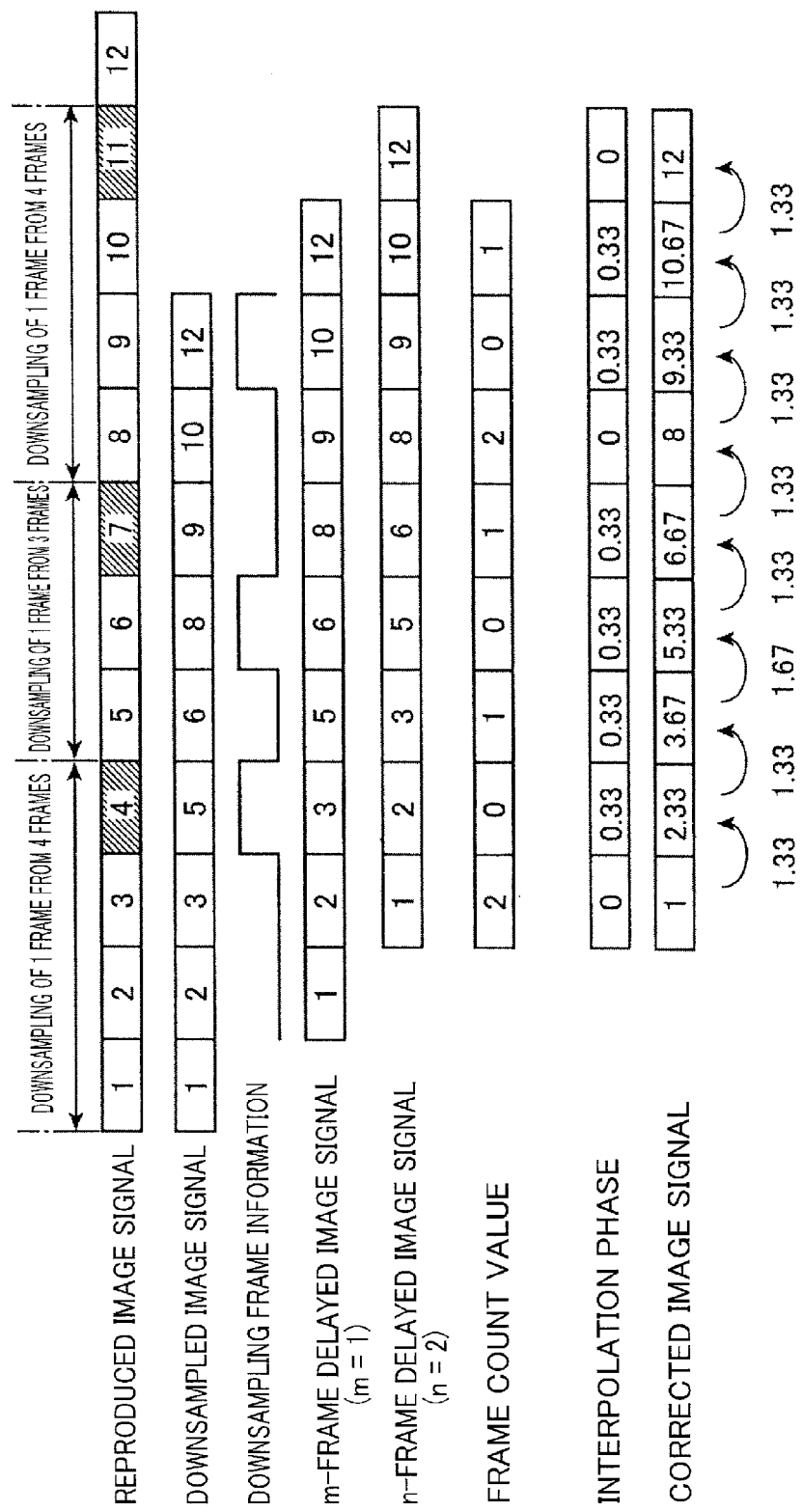
FIG. 5 is a timing chart for explaining the processing of correcting the downsampled image signal when the downsampling period returns again to 1/4 after being changed from 1/4 to 1/3.

FIG. 5 is a timing chart for explaining the processing of correcting the downsampled image signal when the downsampling period changes from 1/4 to 1/3 and then returns again to 1/4.

In the reproduced image signal in FIG. 5, the frame image is thinned with a downsampling period of 1/4, but along the way, the frame image is also thinned at a downsampling period of 1/3. As a result, the motion amount between the third interpolation frame image and the fourth interpolation frame image is "1.67", and the motion amount between other interpolation frame images is "1.33". Therefore, the image becomes discontinuous during switching from the third interpolation frame image to the fourth interpolation frame image. However, before and after the downsampling period is disturbed, that is, when the frame image is thinned at a downsampling period of 1/4, the image signal is corrected correctly. Therefore, no particular visual discomfort is created despite the presence of one-frame discontinuity.

Figure 6:
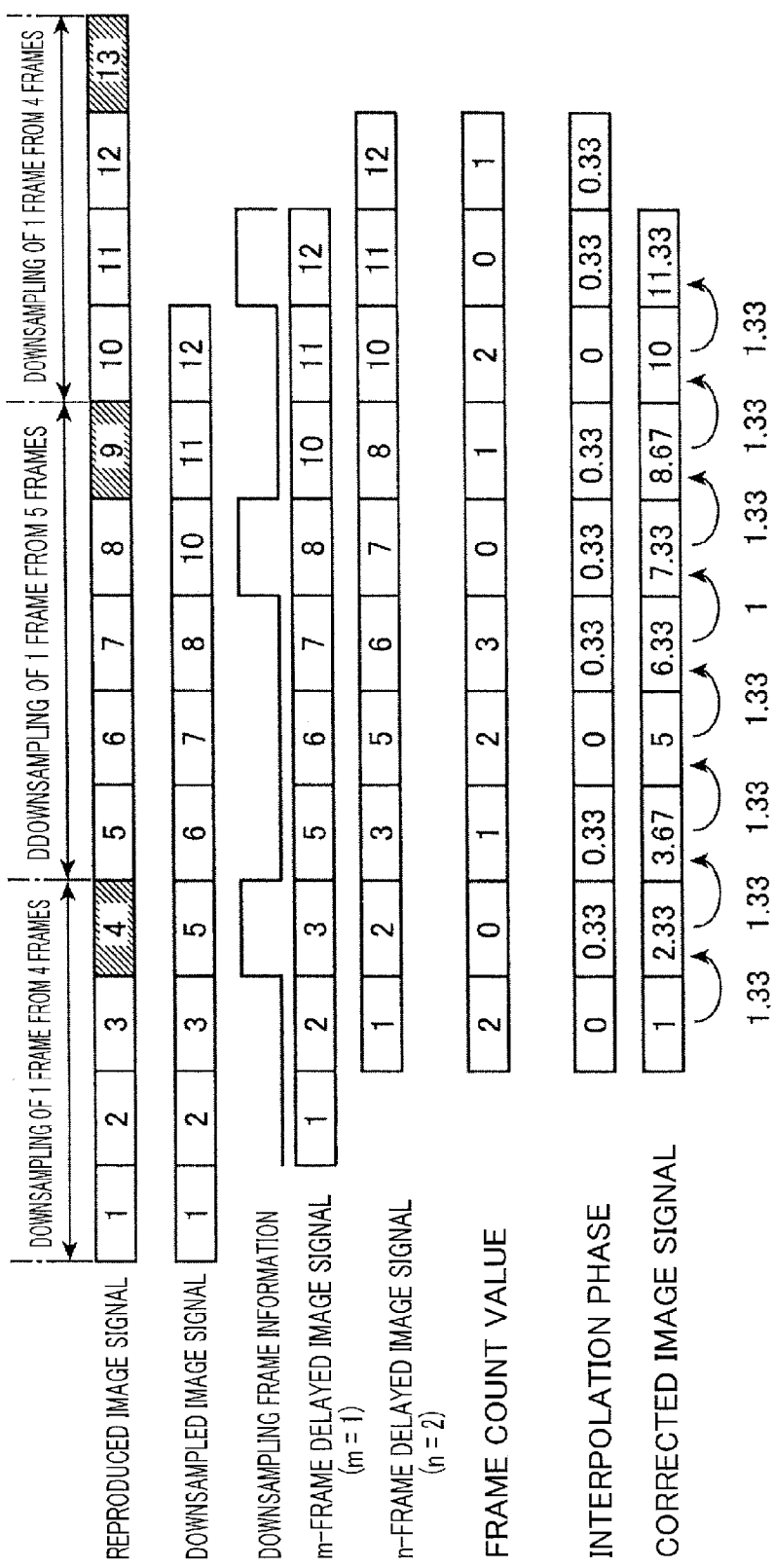
FIG. 6 is a timing chart for explaining the processing of correcting the downsampled image signal when the downsampling period returns again to 1/4 after being changed from 1/4 to 1/5.

FIG. 6 shows a timing chart for explaining the processing of correcting the downsampled image signal when the downsampling period changes from 1/4 to 1/5 and then returns again to 1/4.

In the reproduced image signal in FIG. 6, the frame image is thinned with a downsampling period of 1/4, but along the way, the frame image is also thinned at a downsampling period of 1/5. As a result, the motion amount between the fifth interpolation frame image and the sixth interpolation frame image is "1", and the motion amount between other interpolation frame images is "1.33". Therefore, the image becomes discontinuous during switching from the fifth interpolation frame image to the sixth interpolation frame image. However, before and after the downsampling period is disturbed, that is, when the frame image is thinned at a downsampling period of 1/4, the image signal is corrected correctly. Therefore, no particular visual discomfort is created despite the presence of one-frame discontinuity.

Explained below is the processing of correcting a downsampled image signal in which two consecutive frame images have been thinned from among eight frame images within one period of the downsampling periods, that is, the downsampled image signal for which the downsampling period is 2/8, and displaying the corrected image signal.

Figure 7:
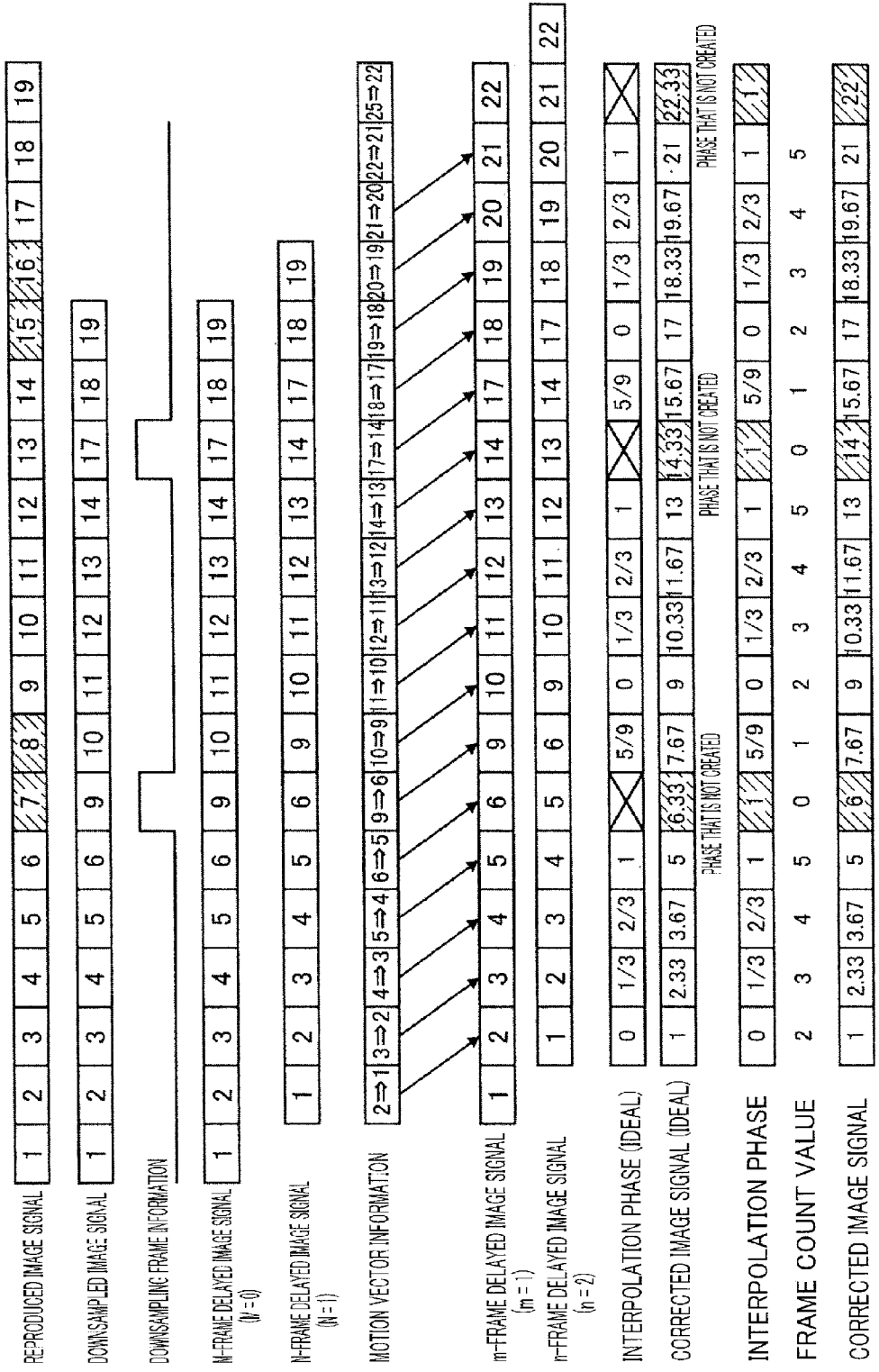
FIG. 7 is a timing chart for explaining the processing of correcting the downsampled image signal with a downsampling period of 2/8 in Embodiment 1.

FIG. 7 is a timing chart for explaining the processing of correcting the downsampled image signal with a downsampling period of 2/8 in Embodiment 1. The digits in the reproduced image signal, downsampled image signal, M-frame delayed image signal, N-frame delayed image signal, m-frame delayed image signal, and n-frame delayed image signal represent frame numbers.

The image signal acquisition unit 211 acquires the image signal in which two consecutive frame images have been thinned from among eight frame images within one period of downsampling periods. In the downsampled image signal shown in FIG. 7, the frame images with frame numbers "7", "8", "15", and "16" have been omitted. Thus, the seventh and eighth frame images from among the consecutive first to eighth frame images within one period of downsampling periods have been thinned.

The downsampling frame information represents information acquired by the downsampling frame information acquisition unit 212 and inputted to the interpolation phase generator 215. The downsampling frame information is a pulse signal representing the downsampling timing at which the frame image has been thinned, and has a high level "1" when the frame image has been thinned and a low level "0" when the frame image has not been thinned. The downsampling frame information shown in FIG. 7 has the high level "1" at timings at which frame images with frame numbers "9" and "17" of the downsampled image signal are outputted.

Further, the M-frame delayed image signal represents an image signal delayed, for example, by 0 frames, the N-frame delayed image signal represents an image signal delayed, for example, by 1 frame (M+1 frames), the m-frame delayed image signal represents an image signal delayed, for example, by 1 frame (M+1 frames), and the n-frame delayed image signal represents an image signal delayed, for example, by 2 frames (N+1 frames). The M-frame delayed image signal represents an image signal that has not been delayed and is identical to the downsampled image signal.

In the example shown in FIG. 7, the interpolation frame image is generated after the motion vector information on one frame image has been entirely calculated. Therefore, m=M+1 and n=N+1. However, the present invention is not particularly limited to such a configuration, and the interpolation frame image may be also generated while calculating the motion vector information. In this case, m=M and n=N for the M-frame delayed image signal, N-frame delayed image signal, m-frame delayed image signal, and n-frame delayed image signal.

The motion vector information represents the frame number of the frame image for which the motion vector is to be calculated and the frame number of the frame image that is referred to when the motion vector is calculated. The motion vector detector 214 detects the motion vector by using the M-frame delayed image signal and the N-frame delayed image signal outputted from the frame memory 213.

In this case, as shown in FIG. 7, the frame images of the ideal corrected image signal are "1", "2.33", "3.67", "5", "6.33", "7.67", . . . . At this time, the interpolation frame image corresponding to "1" of the ideal corrected image signal is generated on the basis of the ideal interpolation phase "0", the interpolation frame image corresponding to "2.33" of the ideal corrected image signal is generated on the basis of the ideal interpolation phase "1/3", the interpolation frame image corresponding to "3.67" of the ideal corrected image signal is generated on the basis of the ideal interpolation phase "2/3", the interpolation frame image corresponding to "5" of the ideal corrected image signal is generated on the basis of the ideal interpolation phase "1", and the interpolation frame image corresponding to "7.67" of the ideal corrected image signal is generated on the basis of the ideal interpolation phase "5/9".

Here, the interpolation frame image corresponding to "6.33" of the ideal corrected image signal cannot be generated because there is no interpolation phase. When the interpolation frame image corresponding to "6.33" of the ideal corrected image signal is generated, a motion vector is used that makes a transition from the frame image with the frame number "6" to the frame image with the frame number "5", but since the interpolation position "6.33" of the interpolation frame image exceeds the frame number "6", an image signal cannot be generated from the mutually adjacent frame images with the frame numbers "5" and "6". For this reason, the interpolation phase generator 215 cannot generate an interpolation phase for generating the interpolation frame image corresponding to "6.33".

Accordingly, in the present embodiment, when the interpolation frame image cannot be generated from the mutually adjacent frame images, the interpolation frame generator 216 selects from the image signal a frame image that is the closest to the interpolation frame image that should be generated and generates the selected frame image as the interpolation frame image.

The interpolation phase generator 215 takes as "1" the interpolation phase corresponding to the fifth interpolation frame image from among the first to sixth interpolation frame images within one period of downsampling periods. The interpolation phase generator 215 includes a frame counter that counts the number of frame images after the frame image has been thinned. The frame count value that is counted by the frame counter changes correspondingly to the downsampling frame information. The frame count value is reset to 0 when the downsampling frame information has a high level "1", and incremented when the downsampling frame information has a low level "0".

The interpolation phase represents the position at which the interpolation frame image is generated between two adjacent images when the distance between the two adjacent images is taken as 1 within one frame period representing the period in which one frame image is displayed. A table in which the frame count values and interpolation phases are associated with each other has been stored in advance in the interpolation phase generator 215. The interpolation phase "0" is associated with the frame count value "2", the interpolation phase "1/3" is associated with the frame count value "3", the interpolation phase "2/3" is associated with the frame count value "4", the interpolation phase "1" is associated with the frame count value "5", the interpolation phase "1" is associated with the frame count value "0", and the interpolation phase "5/9" is associated with the frame count value "1". The interpolation phase generator 215 refers to the table and selects the interpolation phase corresponding to the frame count value of the frame counter.

Then, the interpolation frame generator 216 generates an interpolation frame image corresponding to the interpolation phase on the basis of the m-frame delayed image signal and the n-frame delayed image signal outputted from the frame memory 213 and the motion vector detected by the motion vector detector 214.

Since the interpolation phase corresponding to the first interpolation frame image is "0", the first frame image of the n-frame delayed image signal is outputted as the first interpolation frame image. Since the interpolation phase corresponding to the second interpolation frame image is "1/3", the interpolation frame image at a position corresponding to "2.33" between the second frame image of the n-frame delayed image signal and the third frame image of the m-frame delayed image signal is outputted as the second interpolation frame image. Since the interpolation phase corresponding to the third interpolation frame image is "2/3", the interpolation frame image at a position corresponding to "3.67" between the third frame image of the n-frame delayed image signal and the fourth frame image of the m-frame delayed image signal is outputted as the third interpolation frame image. Since the interpolation phase corresponding to the fourth interpolation frame image is "1", the fifth frame image of the m-frame delayed image signal is outputted as the fourth interpolation frame image. Since the interpolation phase corresponding to the fifth interpolation frame image is "1", the sixth frame image of the m-frame delayed image signal is outputted as the fifth interpolation frame image. Since the interpolation phase corresponding to the sixth interpolation frame image is "5/9", the interpolation frame image at a position corresponding to "7.67" between the sixth frame image of the n-frame delayed image signal and the ninth frame image of the m-frame delayed image signal is outputted as the sixth interpolation frame image. The first to sixth interpolation frame images are outputted in each period.

Thus, even when an interpolation frame image cannot be generated from mutually adjacent frame images, the interpolation frame image can be generated by shifting the interpolation phase, and the image which is free of visual discomfort can be displayed.

Explained below is the processing of correcting a downsampled image signal in which one frame image has been thinned from among the three frame images within one period of the downsampling periods, that is, the downsampled image signal for which the downsampling period is 1/3, and displaying the corrected image signal.

Figure 8:
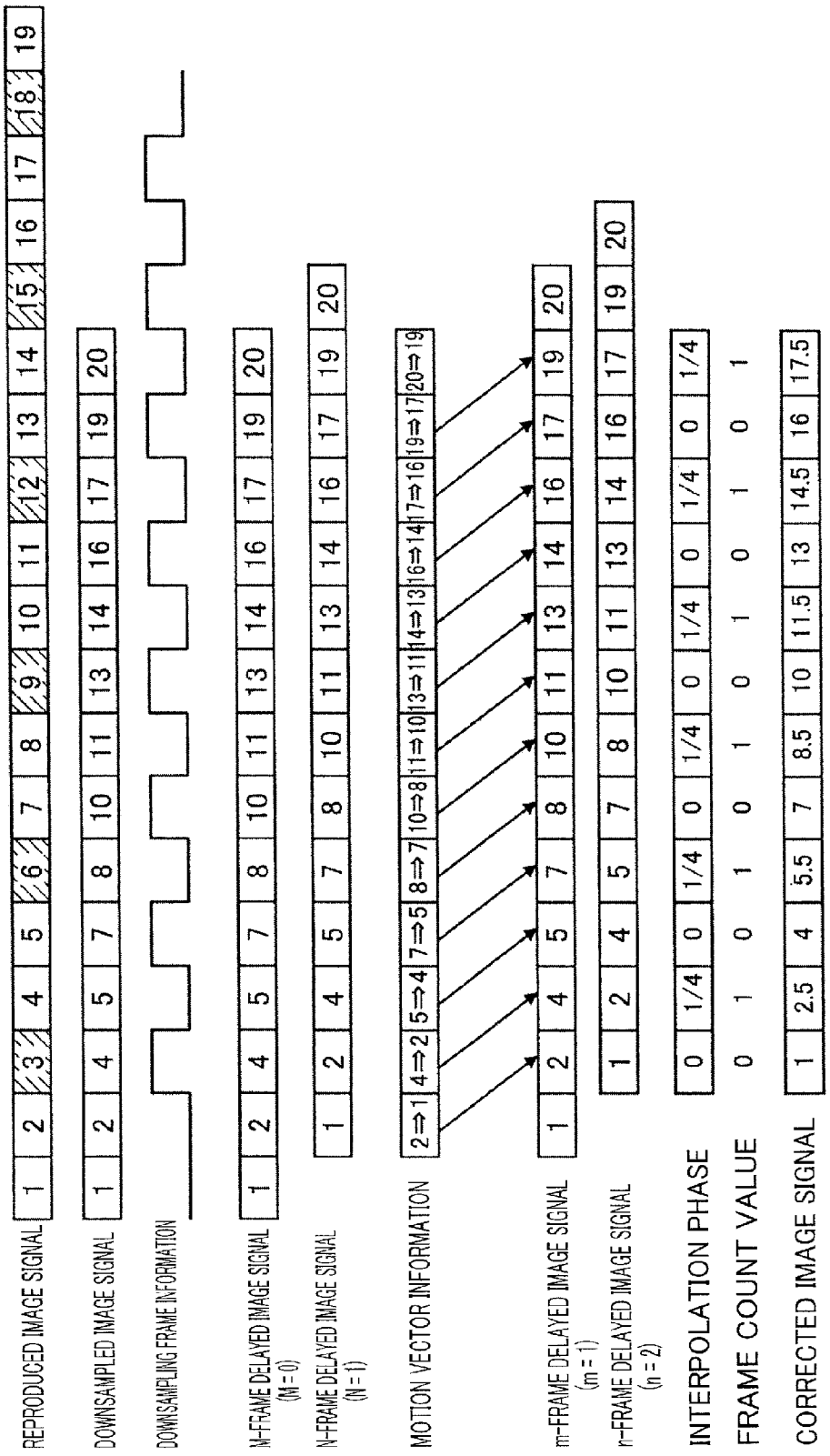
FIG. 8 is a timing chart for explaining the processing of correcting the downsampled image signal with a downsampling period of 1/3 in Embodiment 1.

FIG. 8 is a timing chart for explaining the processing of correcting the downsampled image signal with a downsampling period of 1/3 in Embodiment 1. The digits in the reproduced image signal, downsampled image signal, M-frame delayed image signal, N-frame delayed image signal, m-frame delayed image signal, and n-frame delayed image signal represent frame numbers.

The image signal acquisition unit 211 acquires the image signal in which one frame image has been thinned from among the three frame images within one period of downsampling periods. In the downsampled image signal shown in FIG. 8, the frame images with frame numbers "3", "6", "9", "12", "15", and "18" have been omitted. Thus, the third frame image from among the consecutive first to third frame images within one period of downsampling periods has been thinned.

The downsampling frame information represents information acquired by the downsampling frame information acquisition unit 212 and inputted to the interpolation phase generator 215. The downsampling frame information is a pulse signal representing the downsampling timing at which the frame image has been thinned, and has a high level "1" when the frame image has been thinned and a low level "0" when the frame image has not been thinned. The downsampling frame information shown in FIG. 8 has the high level "1" at timings at which frame images with frame numbers "4", "7", "10", "13", "16", and "19" of the downsampled image signal are outputted.

Further, the M-frame delayed image signal represents an image signal delayed, for example, by 0 frames, the N-frame delayed image signal represents an image signal delayed, for example, by 1 frame (M+1 frames), the m-frame delayed image signal represents an image signal delayed, for example, by 1 frame (M+1 frames), and the n-frame delayed image signal represents an image signal delayed, for example, by 2 frames (N+1 frames). The M-frame delayed image signal represents an image signal that has not been delayed and is identical to the downsampled image signal.

In the example shown in FIG. 8, the interpolation frame image is generated after the motion vector information on one frame image has been entirely calculated. Therefore, m=M+1 and n=N+1. However, the present invention is not particularly limited to such a configuration, and the interpolation frame image may be also generated while calculating the motion vector information. In this case, m=M and n=N for the M-frame delayed image signal, N-frame delayed image signal, m-frame delayed image signal, and n-frame delayed image signal.

The motion vector information represents the frame number of the frame image for which the motion vector is to be calculated and the frame number of the frame image that is referred to when the motion vector is calculated. The motion vector detector 214 detects the motion vector by using the M-frame delayed image signal and the N-frame delayed image signal outputted from the frame memory 213.

The interpolation phase generator 215 includes a frame counter that counts the number of frame images after the frame image has been thinned. The frame count value that is counted by the frame counter changes correspondingly to the downsampling frame information. The frame count value is reset to 0 when the downsampling frame information has a high level "1", and incremented when the downsampling frame information has a low level "0".

The interpolation phase represents the position at which the interpolation frame image is generated between two adjacent images when the distance between the two adjacent images is taken as 1 within one frame period representing the period in which one frame image is displayed. A table in which the frame count values and interpolation phases are associated with each other has been stored in advance in the interpolation phase generator 215. The interpolation phase "0" is associated with the frame count value "0", and the interpolation phase "1/4" is associated with the frame count value "1". The interpolation phase generator 215 refers to the table and selects the interpolation phase corresponding to the frame count value of the frame counter.

The interpolation phase generator 215 generates the interpolation phase such that a phase distance between a leading first interpolation frame image from among a plurality of interpolation frame images within one period of downsampling periods and a second interpolation frame image that follows the first interpolation frame image becomes equal to a phase distance between mutually adjacent interpolation frame images attained when phase distances between a plurality of interpolation frame images are equalized within one period of downsampling periods.

For example, the interpolation phase corresponding to the first interpolation frame image is "0", and the interpolation phase corresponding to the second interpolation frame image is "1/4".

As shown in FIG. 2, the interpolation frame generator 216 generates an interpolation frame image corresponding to the interpolation phase on the basis of the m-frame delayed image signal and the n-frame delayed image signal outputted from the frame memory 213 and the motion vector detected by the motion vector detector 214.

Since the interpolation phase corresponding to the first interpolation frame image is "0", the first frame image of the n-frame delayed image signal is outputted as the first interpolation frame image. Since the interpolation phase corresponding to the second interpolation frame image is "1/4", the interpolation frame image at a position corresponding to "2.5" between the second frame image of the n-frame delayed image signal and the fourth frame image of the m-frame delayed image signal is outputted as the second interpolation frame image. The first and second interpolation frame images are outputted in each period.

Embodiment 2

In Embodiment 1, when the downsampled image signal with a downsampling period of 2/8 is corrected, an interpolation frame image is present that cannot be generated from the mutually adjacent frame images. Therefore, in Embodiment 1, when the interpolation frame image cannot be generated from the mutually adjacent frame images, the interpolation frame generator selects the frame image that is the closest to the interpolation frame image, which is to be generated, from the image signal and generates the selected frame image as the interpolation frame image. By contrast, when the interpolation frame image cannot be generated from the mutually adjacent frame images, the interpolation frame generator in Embodiment 2 generates the interpolation frame image from the mutually adjacent frame images that are next to the aforementioned mutually adjacent frame images.

Figure 9:
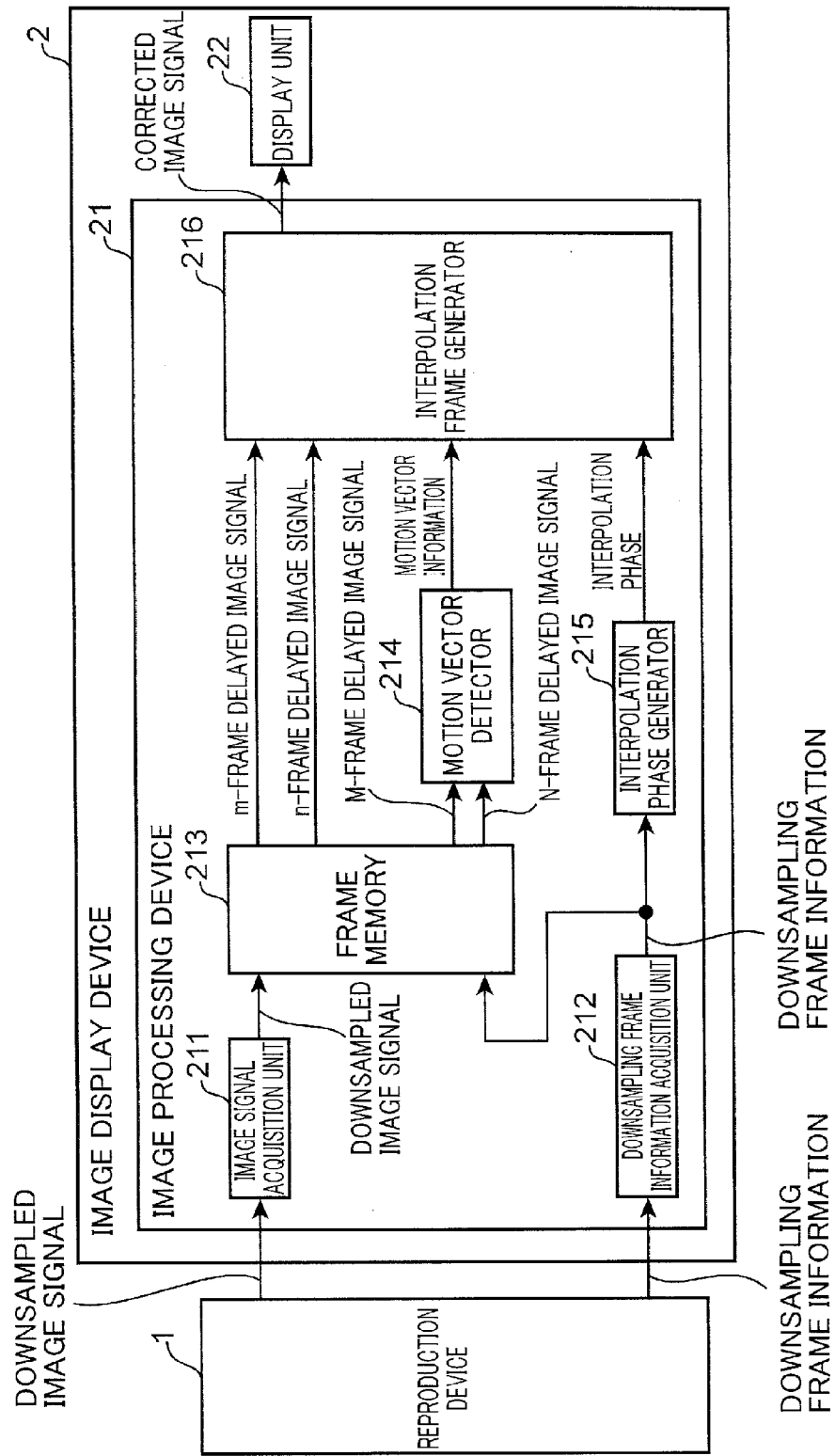
FIG. 9 illustrates the configuration of the image display device of Embodiment 2 of the present invention.

FIG. 9 shows the configuration of the image display device in Embodiment 2 of the present invention. The image display device 2 shown in FIG. 9 is provided with the image processing device 21 and the display unit 22. The image processing device 21 is provided with the image signal acquisition unit 211, the downsampling frame information acquisition unit 212, the frame memory 213, the motion vector detector 214, the interpolation phase generator 215, and the interpolation frame generator 216. In FIG. 9, the explanation of components same as those of the image display device of Embodiment 1 shown in FIG. 1 is omitted.

The downsampling frame information acquisition unit 212 acquires from the reproduction device 1 downsampling frame information representing the downsampling timing at which at least one frame image of the downsampled image signal acquired by the image signal acquisition unit 211 is thinned. The downsampling frame information acquisition unit 212 outputs the acquired downsampling frame information to the interpolation phase generator 215 and the frame memory 213.

The frame memory 213 stores, in frame units, the downsampled image signal acquired by the image signal acquisition unit 211. The frame memory 213 outputs an M-frame delayed image signal and an N-frame delayed image signal to the motion vector detector 214, and outputs an m-frame delayed image signal and an n-frame delayed image signal to the interpolation frame generator 216. The M-frame delayed image signal represents an image signal delayed, for example, by 0 frames, the N-frame delayed image signal represents an image signal delayed, for example, by 1 frame (M+1 frames), the m-frame delayed image signal represents an image signal delayed, for example, by 1 frame (M+1 frames) or 0 frames (M-frames), and the n-frame delayed image signal represents an image signal delayed, for example, by 2 frames (N+1 frames) or 1 frame (N-frames). The frame memory 213 switches the number of frames by which the m-frame delayed image signal and the n-frame delayed image signal are delayed on the basis of the downsampling frame information acquired by the downsampling frame information acquisition unit 212.

The interpolation phase generator 215 generates the interpolation phase such as to equalize the phase distance of the six interpolation frame images within one period of downsampling periods. When the interpolation frame image cannot be generated from the mutually adjacent frame images, the interpolation frame generator 216 generates an interpolation frame image from the mutually adjacent frame images that are next to the aforementioned mutually adjacent frame images.

The operation of the image display device 2 shown in FIG. 9 is explained below. Explained below is the processing of correcting a downsampled image signal obtained by thinning two frame images from among eight frame images within one period of downsampling periods, that is, the downsampled image signal with a downsampling period of 2/8, and displaying the corrected image signal.

Figure 10:
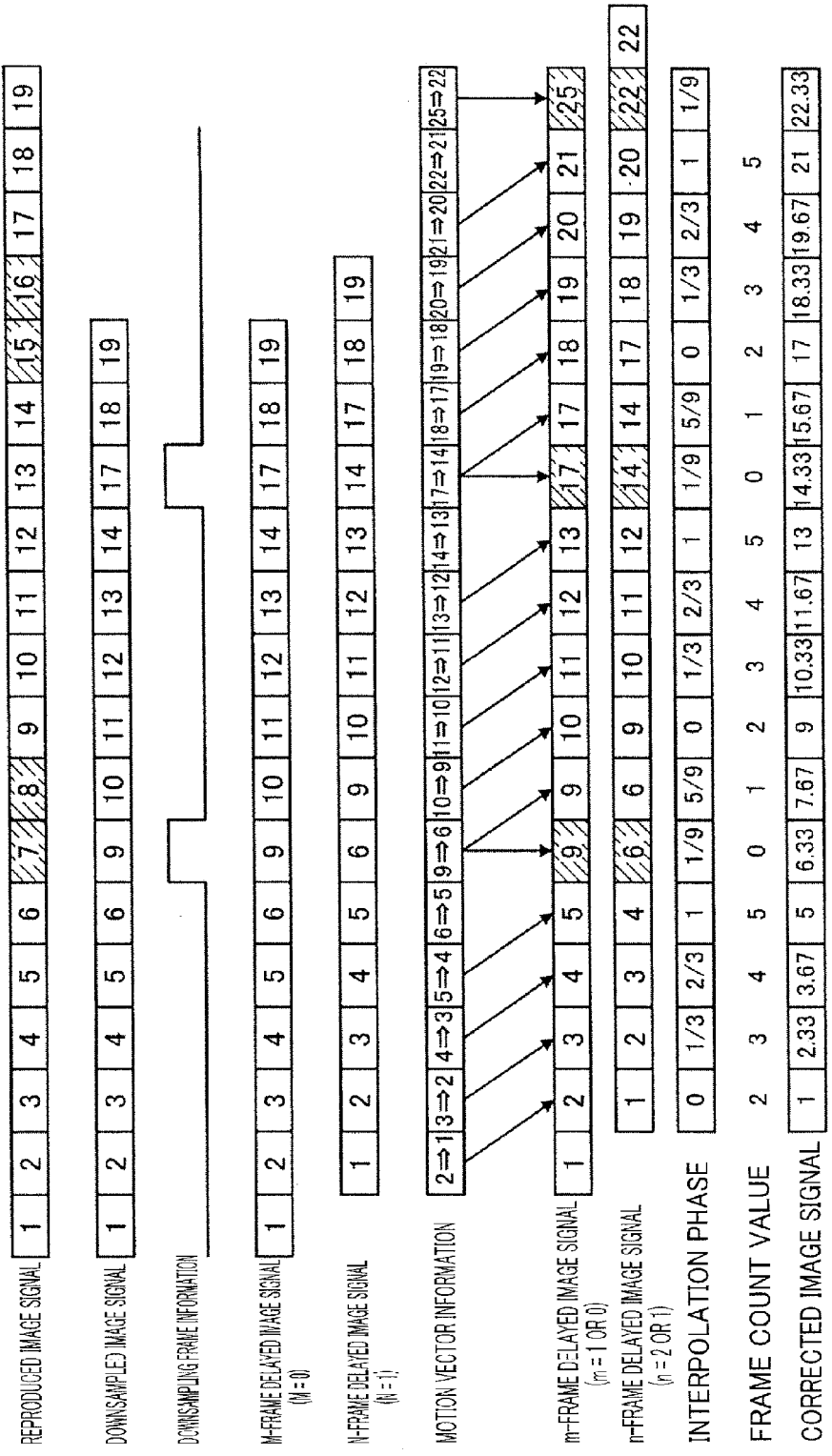
FIG. 10 is a timing chart for explaining the processing of correcting the downsampled image signal with a downsampling period of 2/8 in Embodiment 2.

FIG. 10 is a timing chart for explaining the processing of correcting the downsampled image signal with a downsampling period of 2/8 in Embodiment 2. The digits in the reproduced image signal, downsampled image signal, M-frame delayed image signal, N-frame delayed image signal, m-frame delayed image signal, and n-frame delayed image signal represent frame numbers.

In Embodiment 2, the reproduced image signal, downsampled image signal, M-frame delayed image signal, N-frame delayed image signal, and motion vector information are the same as the signals in the timing chart of Embodiment 1 shown in FIG. 7, and the explanation thereof is, therefore, omitted.

When the downsampling frame information has a low level "0", the frame memory 213 outputs a 1-frame delayed image signal and a 2-frame delayed image signal to the interpolation frame generator 216, and when the downsampling frame information has a high level "1", the frame memory outputs a 0-frame delayed image signal and a 1-frame delayed image signal to the interpolation frame generator 216. Thus, based on the downsampling frame information acquired by the downsampling frame information acquisition unit 212, the frame memory 213 outputs the m-frame delayed image signal (m=M+1) and the n-frame delayed image signal (n=N+1) when the frame image has not been thinned, and outputs the m-frame delayed image signal (m=M) and the n-frame delayed image signal (n=N) when the frame image has been thinned.

The interpolation phase generator 215 includes a frame counter that counts the number of frame images after the frame image has been thinned. The frame count value that is counted by the frame counter changes correspondingly to the downsampling frame information. The frame count value is reset to 0 when the downsampling frame information has a high level "1", and incremented when the downsampling frame information has a low level "0".

The interpolation phase represents the position at which the interpolation frame image is generated between two adjacent images when the distance between the two adjacent images is taken as 1 within one frame period representing the period in which one frame image is displayed. A table in which the frame count values and interpolation phases are associated with each other has been stored in advance in the interpolation phase generator 215. The interpolation phase "0" is associated with the frame count value "2", the interpolation phase "1/3" is associated with the frame count value "3", the interpolation phase "2/3" is associated with the frame count value "4", the interpolation phase "1" is associated with the frame count value "5", the interpolation phase "1/9" is associated with the frame count value "0", and the interpolation phase "5/9" is associated with the frame count value "1".

The interpolation phase generator 215 refers to the table and selects the interpolation phase corresponding to the frame count value of the frame counter.

Then the interpolation frame generator 216 generates the interpolation frame image corresponding to the interpolation phase on the basis of the m-frame delayed image signal and n-frame delayed image signal outputted from the frame memory 213 and the motion vector detected by the motion vector detector 214.

Since the interpolation phase corresponding to the first interpolation frame image is "0", the first frame image of the n-frame delayed image signal is outputted as the first interpolation frame image. Since the interpolation phase corresponding to the second interpolation frame image is "1/3", the interpolation frame image at a position corresponding to "2.33" between the second frame image of the n-frame delayed image signal and the third frame image of the m-frame delayed image signal is outputted as the second interpolation frame image. Since the interpolation phase corresponding to the third interpolation frame is "2/3", the interpolation frame image at a position corresponding to "3.67" between the third frame image of the n-frame delayed image signal and the fourth frame image of the m-frame delayed image signal is outputted as the third interpolation frame image. Since the interpolation phase corresponding to the fourth interpolation frame is "1", the fifth frame image of the m-frame delayed image signal is outputted as the fourth interpolation frame image. Since the interpolation phase corresponding to the fifth interpolation frame is "1/9", the interpolation frame image at a position corresponding to "6.33" between the sixth frame image of the n-frame delayed image signal and the ninth frame image of the m-frame delayed image signal is outputted as the fifth interpolation frame image. Since the interpolation phase corresponding to the sixth interpolation frame is "5/9", the interpolation frame image at a position corresponding to "7.67" between the sixth frame image of the n-frame delayed image signal and the ninth frame image of the m-frame delayed image signal is outputted as the sixth interpolation frame image. The first to sixth interpolation frame images are outputted in each period.

When the ideal corrected image signal corresponding to "6.33" is generated, a motion vector is used that makes a transition from the frame image with the frame number "9" to the frame image with the frame number "6", instead of using the motion vector that makes a transition from the frame image with the frame number "6" to the frame image with the frame number "5". For this reason, the interpolation phase generator 215 can generate an interpolation phase for generating the ideal corrected image signal corresponding to "6.33".

An image display device of the first variation example of Embodiment 2 is explained below. The motion vector detector in the first variation example of Embodiment 2 detects the motion vector on the basis of a frame image that is not delayed with respect to the image signal and a frame image that has been delayed by one frame with respect to the image signal, and detects a motion vector on the basis of a frame image that has been delayed by one frame with respect to the image signal and a frame image that has been delayed by two frames with respect to the image signal at the downsampling timing at which at least one frame image specified by the downsampling frame information has been thinned. The configuration of the image display device in the first variation example of Embodiment 2 is the same as that of the image display device in Embodiment 2 shown in FIG. 9, and the explanation below is conducted using the image display device shown in FIG. 9.

Figure 11:
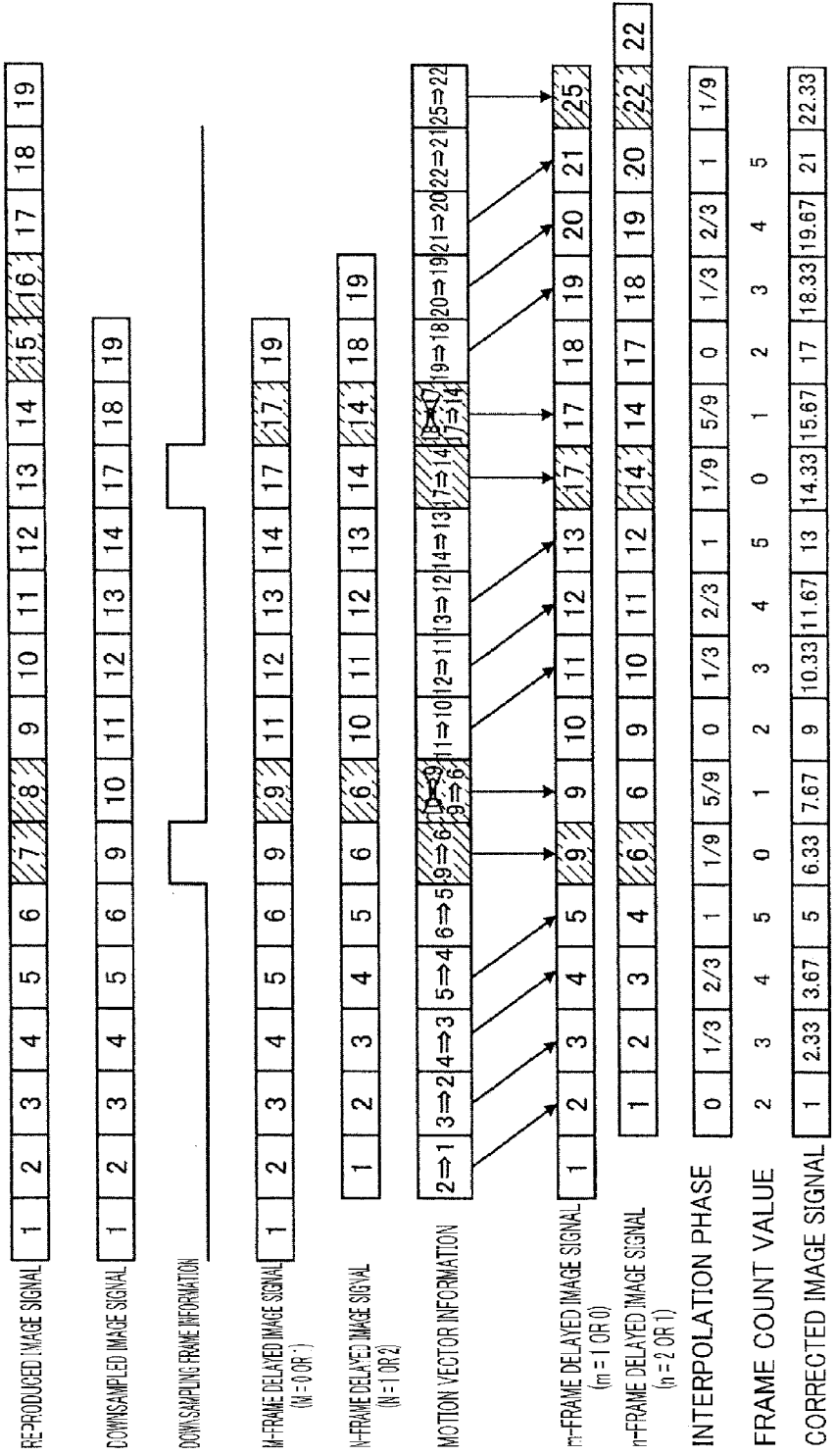
FIG. 11 is a timing chart for explaining the processing of correcting the downsampled image signal with a downsampling period of 2/8 in the first variation example of Embodiment 2.

FIG. 11 is a timing chart for explaining the processing of correcting the downsampled image signal with a downsampling period of 2/8 in the first variation example of Embodiment 2. The digits in the reproduced image signal, downsampled image signal, M-frame delayed image signal, N-frame delayed image signal, m-frame delayed image signal, and n-frame delayed image signal represent frame numbers.

In the first variation example of Embodiment 2, the reproduced image signal, downsampled image signal, and downsampling frame information are the same as the signals in the timing chart of Embodiment 1 shown in FIG. 7, and the explanation thereof is, therefore, omitted.

When the downsampling frame information has a low level "0", the frame memory 213 outputs a 0-frame delayed image signal and a 1-frame delayed image signal to the motion vector detector 214, and when the downsampling frame information has a high level "1", the frame memory switches the image signal outputted next to the image signal for which the downsampling frame information has a high level "1" to a 1-frame delayed image signal and a 2-frame delayed image signal and outputs those signals to the motion vector detector 214. Thus, based on the downsampling frame information acquired by the downsampling frame information acquisition unit 212, the frame memory 213 outputs the M-frame delayed image signal (M=0) and the N-frame delayed image signal (N=1) when the frame image has not been thinned, and switches the image signal outputted next to the image signal for which the frame image has been thinned to the M-frame delayed image signal (M=1) and the N-frame delayed image signal (N=2) and outputs those signals when the frame image has been thinned.

As a result, as shown in FIG. 11, the frame memory 213 switches from the M-frame delayed image signal for which the frame number is "10" to the M-frame delayed image signal for which the frame number is "9" and outputs this signal, and also switches from the N-frame delayed image signal for which the frame number is "9" to the N-frame delayed image signal for which the frame number is "6" and outputs this signal. At a timing at which the original frame image is outputted, the motion vector is not necessary. Therefore, it is not necessary to detect the motion vector that makes a transition from the frame image with a frame number "10" to the frame image with a frame number "9".

As a result, the motion vector detector 214 detects twice in succession the motion vector that makes a transition from the frame image with a frame number "9" to the frame image with a frame number "6". In this case, the motion vector detector 214 detects the second motion vector by using the detection result for the first motion vector. When the motion vectors of the same frame image are thus detected, the detection accuracy of the second motion vector can be increased by detecting the second motion vector by using the detection result for the first motion vector.

When the downsampling frame information has a low level "0", the frame memory 213 outputs the 1-frame delayed image signal and the 2-frame delayed image signal to the interpolation frame generator 216, and when the downsampling frame information has a high level "1", the frame memory outputs the 0-frame delayed image signal and the 1-frame delayed image signal to the interpolation frame generator 216. Thus, based on the downsampling frame information acquired by the downsampling frame information acquisition unit 212, the frame memory 213 outputs the m-frame delayed image signal (m=M+1) and the n-frame delayed image signal (n=N+1) when the frame image has not been thinned, and outputs the m-frame delayed image signal (m=M) and the n-frame delayed image signal (n=N) when the frame image has been thinned.

The processing performed in the interpolation phase generator 215 and the interpolation frame generator 216 in the first variation example of Embodiment 2 are the same as those in the above-described Embodiment 2 and the explanation thereof is, therefore, omitted.

Thus, the mutually adjacent frame images used for detecting the motion vector when the frame image has been thinned and the mutually adjacent frame images used for detecting the motion vector before the frame image is thinned become identical, and the motion vector is detected twice in succession on the basis of the identical mutually adjacent frame image. Therefore, the detection accuracy of the second motion vector can be increased by detecting the second motion vector by using the detection result for the first motion vector.

An image display device of the second variation example of Embodiment 2 is explained below. In the second variation example of Embodiment 2, when reliability of the motion vector detected at a downsampling timing at which the frame image has been thinned in the first variation example of Embodiment 2 is low, a prescribed interpolation phase is set that has been determined in advance, instead of generating the interpolation frame image by using the motion vector. The configuration of the image display device in the second variation example of Embodiment 2 is the same as that of the image display device in Embodiment 2 shown in FIG. 9. Therefore, the explanation below is performed using the image display device shown in FIG. 9.

Figure 12:
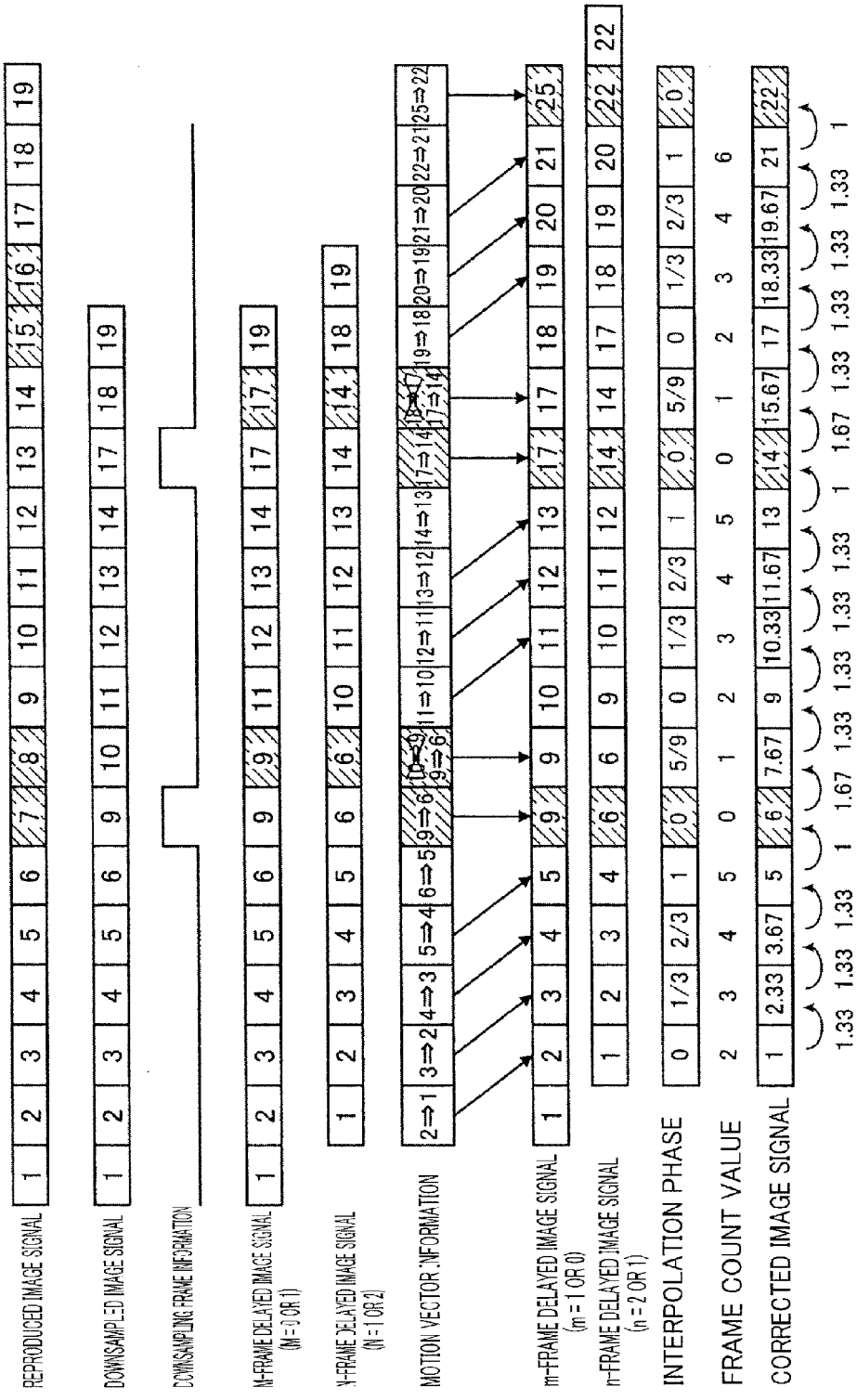
FIG. 12 is a timing chart for explaining the processing of correcting the downsampled image signal with a downsampling period of 2/8 in the second variation example of Embodiment 2.

FIG. 12 is a timing chart for explaining the processing of correcting the downsampled image signal with a downsampling period of 2/8 in the second variation example of Embodiment 2. The digits in the reproduced image signal, downsampled image signal, M-frame delayed image signal, N-frame delayed image signal, m-frame delayed image signal, and n-frame delayed image signal represent frame numbers.

In the first variation example of Embodiment 2, the reproduced image signal, downsampled image signal, downsampling frame information, motion vector information, M-frame delayed image signal, N-frame delayed image signal, m-frame delayed image signal, and n-frame delayed image signal are the same as the signals in the timing chart of the first variation example of Embodiment 2 shown in FIG. 11, and the explanation thereof is, therefore, omitted.

The motion vector detector 214 detects the motion vector by using the M-frame delayed image signal and the N-frame delayed image signal outputted from the frame memory 213. When the motion vector is detected using the frame image with a frame number "9" and the frame image with a frame number "6", since the frame image with a frame number "9" and the frame image with a frame number "6" are not successive frame images in the reproduced image signal, the reliability of the detected motion vector can decrease.

Accordingly, the interpolation phase generator 215 takes as "0" the interpolation phase corresponding to the fifth interpolation frame image from among the first to sixth interpolation frame images within one period of downsampling periods. The interpolation phase generator 215 includes a frame counter that counts the number of frame images after the frame image has been thinned. The frame count value that is counted by the frame counter changes correspondingly to the downsampling frame information. The frame count value is reset to 0 when the downsampling frame information has a high level "1", and incremented when the downsampling frame information has a low level "0".

The interpolation phase represents the position at which the interpolation frame image is generated between two adjacent images when the distance between the two adjacent images is taken as 1 within one frame period representing the period in which one frame image is displayed. A table in which the frame count values and interpolation phases are associated with each other has been stored in advance in the interpolation phase generator 215. The interpolation phase "0" is associated with the frame count value "2", the interpolation phase "1/3" is associated with the frame count value "3", the interpolation phase "2/3" is associated with the frame count value "4", the interpolation phase "1" is associated with the frame count value "5", the interpolation phase "0" is associated with the frame count value "0", and the interpolation phase "5/9" is associated with the frame count value "1". The interpolation phase generator 215 refers to the table and selects the interpolation phase corresponding to the frame count value of the frame counter.

Then the interpolation frame generator 216 generates the interpolation frame image corresponding to the interpolation phase on the basis of the m-frame delayed image signal and n-frame delayed image signal outputted from the frame memory 213 and the motion vector detected by the motion vector detector 214.

Since the interpolation phase corresponding to the first interpolation frame image is "0", the first frame image of the n-frame delayed image signal is outputted as the first interpolation frame image. Since the interpolation phase corresponding to the second interpolation frame image is "1/3", the interpolation frame image at a position corresponding to "2.33" between the second frame image of the n-frame delayed image signal and the third frame image of the m-frame delayed image signal is outputted as the second interpolation frame image. Since the interpolation phase corresponding to the third interpolation frame is "2/3", the interpolation frame image at a position corresponding to "3.67" between the third frame image of the n-frame delayed image signal and the fourth frame image of the m-frame delayed image signal is outputted as the third interpolation frame image. Since the interpolation phase corresponding to the fourth interpolation frame is "1", the fifth frame image of the m-frame delayed image signal is outputted as the fourth interpolation frame image. Since the interpolation phase corresponding to the fifth interpolation frame is "0", the sixth frame image of the n-frame delayed image signal is outputted as the fifth interpolation frame image. Since the interpolation phase corresponding to the sixth interpolation frame is "5/9", the interpolation frame image at a position corresponding to "7.67" between the sixth frame image of the n-frame delayed image signal and the ninth frame image of the m-frame delayed image signal is outputted as the sixth interpolation frame image. The first to sixth interpolation frame images are outputted in each period.

Thus, even when the motion vector reliability is low, an interpolation frame image with a reduced effect of the motion vector can be generated and an image which is free of visual discomfort can be displayed by setting the interpolation phase in advance.

Further, in the second variation example of Embodiment 2, the interpolation phase at a location where a frame image with a high possibility of decrease in motion vector reliability has been thinned is set as a predetermined interpolation phase, but the present invention is not limited to such a configuration. The image processing device may be provided with a determination unit that determines the reliability of the motion vector detected by the motion vector detector, when the motion vector reliability is determined by the determination unit to be low, the interpolation phase generator may set the interpolation phase such as to select the frame image which is the closest to the interpolation frame image generated using this motion vector from the image signal and generate the selected frame image as the interpolation frame image, and when the motion vector reliability is determined by the determination unit to be high, the interpolation phase generator may set the interpolation phase such as to obtain a phase distance equal to a phase distance between mutually adjacent interpolation frame images attained when phase distances between a plurality of interpolation frame images are equalized within one period of the downsampling periods.

The motion vector detector 214 calculates the absolute value of a difference between the brightness value of each pixel in the block of interest of the present frame image and the brightness value of each pixel of a reference block that has been referred to when detecting the motion vector of the past frame image, and calculates the sum total value of the calculated absolute values of differences as a block matching difference value of the block of interest. The motion vector detector 214 extracts a plurality of candidate vectors serving as candidates for the motion vector when the motion vector is detected. The motion vector detector 214 calculates the absolute value of a difference between the brightness value of each pixel of the block of interest of the present frame image and the brightness value of each pixel of each reference block corresponding to the plurality of candidate vectors of the past frame image, and adds up the absolute values of the difference for each reference block. From among the plurality of candidate vectors, the motion vector detector 214 detects a candidate vector corresponding to the reference block with a minimum sum total value as a motion vector. The motion vector detector 214 also calculates the minimum sum total value as the block matching difference value of the block of interest.

The block matching difference value is an indicator of motion vector reliability. Where the block matching difference value is small, the motion vector reliability is high, and where the block matching difference value is larger, the motion vector reliability is small.

Therefore, the determination unit determines whether or not the block matching difference value is equal to or lower than a predetermined threshold. When the block matching difference value is determined by the determination unit to be greater than the predetermined threshold, the interpolation phase generator 215 associates the interpolation phase "0" with the frame count value "0" in the table information. Meanwhile, where the block matching difference value is determined by the determination unit to be equal to or lower than the predetermined threshold, the interpolation phase generator 215 associates the interpolation phase "1/9" with the frame count value "0" in the table information.

As a result, when the motion vector reliability is low, the interpolation frame image is generated according to the second variation example of Embodiment 2, and when the motion vector reliability is high, the interpolation frame image is generated according to the first variation example of Embodiment 2.

Embodiment 3

In Embodiments 1 and 2, the downsampling frame information acquisition unit acquires the downsampling frame information from the reproduction device, but this unit does not necessarily acquire the downsampling frame information from the reproduction device at all times. In Embodiment 3, the downsampling timing at which the frame image has been thinned is detected and the downsampling frame information is created on the basis of the motion vector detected by the motion vector detection unit, instead of acquiring the downsampling frame information from the reproduction device.

Figure 13:
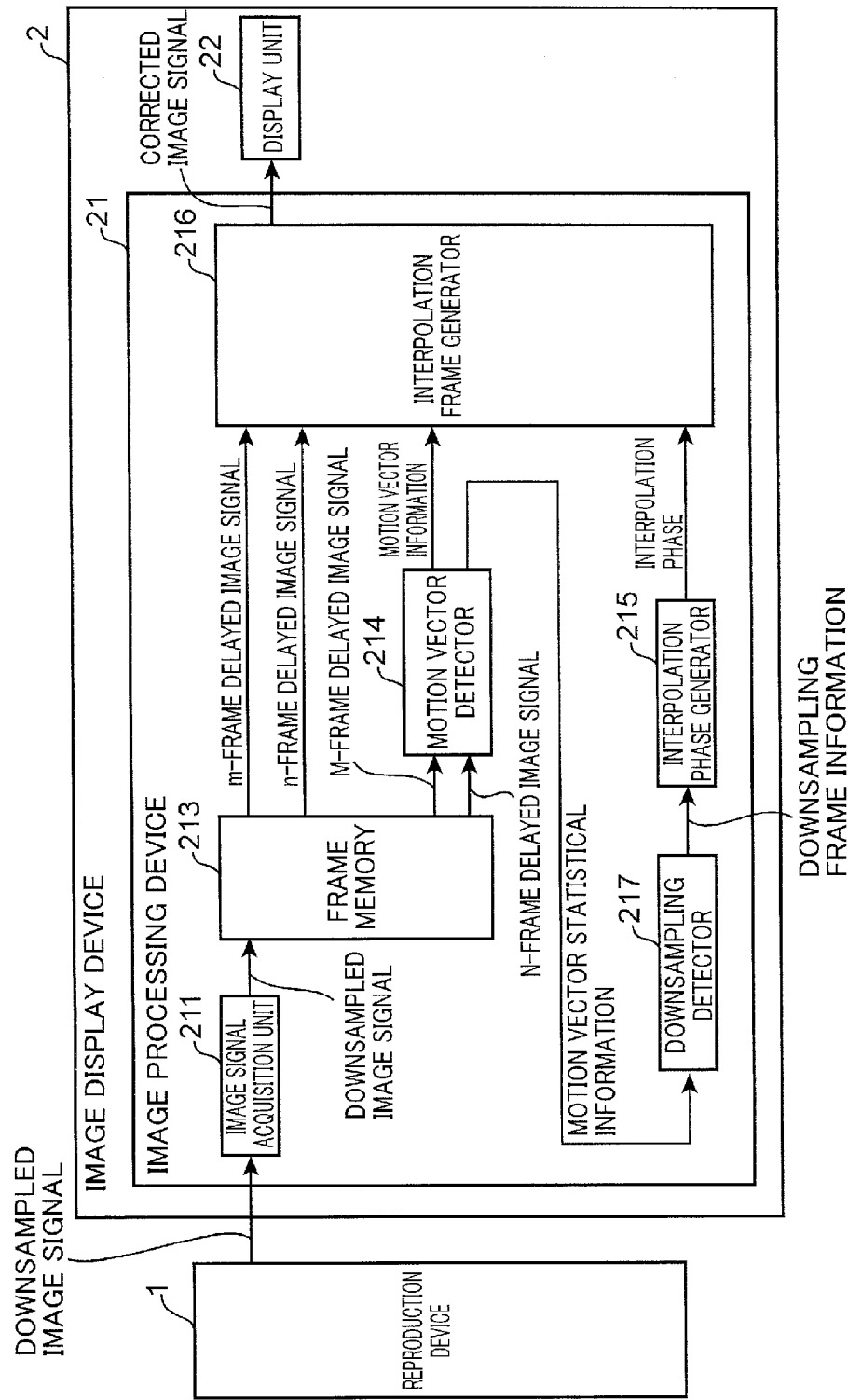
FIG. 13 illustrates the configuration of the image display device of Embodiment 3 of the present invention.

FIG. 13 shows the configuration of the image display device in Embodiment 3 of the present invention. The image display device 2 shown in FIG. 13 is provided with the image processing device 21 and the display unit 22. The image processing device 21 is provided with the image signal acquisition unit 211, the frame memory 213, the motion vector detector 214, the interpolation phase generator 215, the interpolation frame generator 216, and a downsampling detector 217. In FIG. 13, the explanation of components same as those of the image display device of Embodiment 1 shown in FIG. 1 is omitted.

The motion vector detector 214 outputs motion vector statistical information on each frame image to the downsampling detector 217. The motion vector statistical information represents, for example, the average value of the motion vectors for each frame image. The frame image is divided into a plurality of blocks, and a motion vector is calculated for each block. The motion vector detector 214 calculates the average value of the motion vectors for each frame image.

The downsampling detector 217 determines whether or not the motion vector statistical information outputted from the motion vector detector 214 is greater than a predetermined threshold, generates a high-level pulse signal when the motion vector statistical information is determined to be greater than the predetermined threshold, generates a low-level pulse signal when the motion vector statistical information is determined to be equal to or lower than the predetermined threshold, and outputs the generated pulse signals as downsampling frame information to the interpolation phase generator 215.

Figure 14:
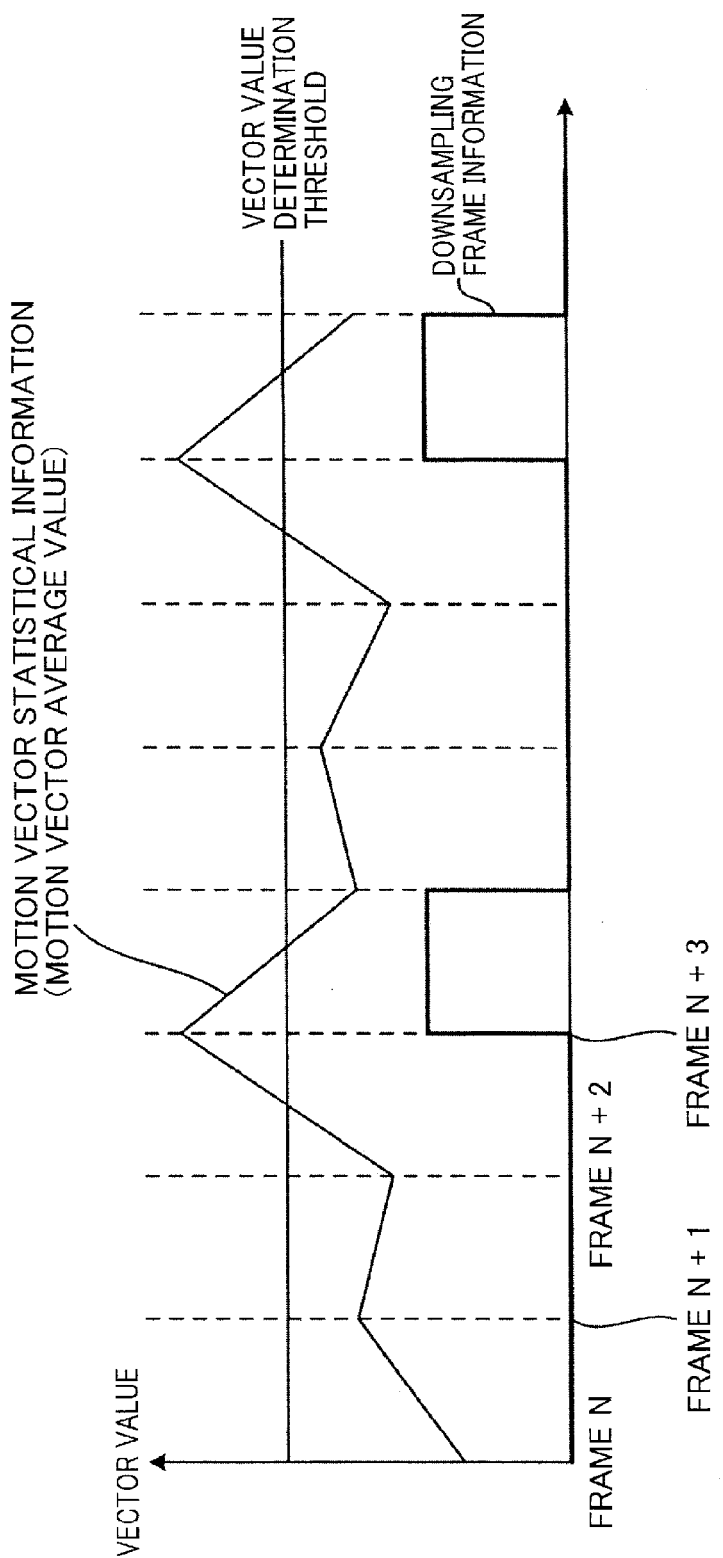
FIG. 14 illustrates the processing of creating downsampling frame information from motion vector information in Embodiment 3.

FIG. 14 illustrates the processing of creating downsampling frame information from motion vector information in Embodiment 3.

As shown in FIG. 14, in frame N to frame N+2, the motion vector statistical information (average value of motion vectors) is equal to or less than a vector value determination threshold, and in the frame N+3, the motion vector statistical information is greater than the vector value determination threshold. Therefore, the downsampling detector 217 generates a low-level pulse signal in the display period of frame N to frame N+2 and generates a high-level pulse signal in the display period of frame N+3. The downsampling detector 217 outputs the generated pulse signals as downsampling frame information to the interpolation phase generator 215.

The operation of the image display device 2 shown in FIG. 13 is explained below. Initially explained is the processing of correcting a downsampled image signal obtained by thinning one frame image from among four frame images within one period of downsampling periods, that is, the downsampled image signal with a downsampling period of 1/4, and displaying the corrected image signal in Embodiment 3.

Figure 15:
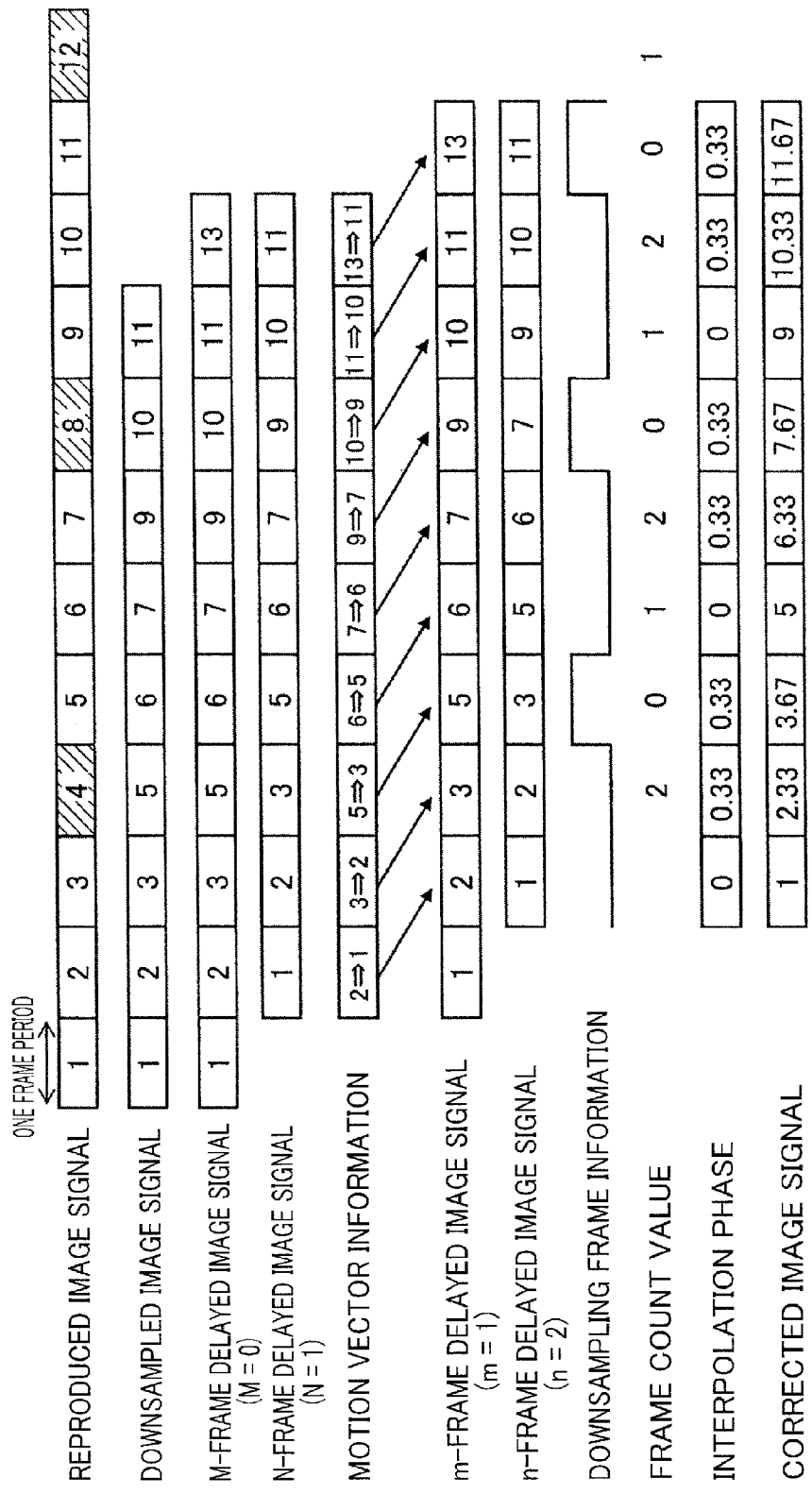
FIG. 15 is a timing chart for explaining the processing of correcting the downsampled image signal with a downsampling period of 1/4 in Embodiment 3.

FIG. 15 is a timing chart for explaining the processing of correcting the downsampled image signal with a downsampling period of 1/4 in Embodiment 3. The digits in the reproduced image signal, downsampled image signal, M-frame delayed image signal, N-frame delayed image signal, m-frame delayed image signal, and n-frame delayed image signal represent frame numbers.

Comparing with the case in which the downsampling frame information is acquired from the reproduction device, which is illustrated in FIG. 2, the reproduced image signal, downsampled image signal, M-frame delayed image signal, N-frame delayed image signal, m-frame delayed image signal, n-frame delayed image signal, and motion vector information are the same, but the downsampling timing of downsampling frame information is different.

As shown in FIG. 15, when the downsampling frame information is created from the motion vector information, the downsampling frame information is detected after the motion vector information has been detected. Therefore, the phase of the pulse signal of the downsampling frame information is delayed by one frame with respect to that in the case in which the downsampling frame information is acquired from the reproduction device.

Accordingly, in the example shown in FIG. 15, the correlation between the frame count value and interpolation phase is different from that in the example shown in FIG. 2. Thus, the interpolation phase "0" is associated with the frame count value "1", and the interpolation phase "0.33" is associated with the frame count values "2" and "0". The interpolation phase generator 215 selects the interpolation phase corresponding to the frame count value of the frame counter by referring to the table.

As a result, the corrected image signal can be obtained at a timing same as that in the case in which the downsampling frame information is acquired from the reproduction device shown in FIG. 2.

The processing of correcting a downsampled image signal with a downsampling period of 1/4 of Embodiment 3 can be also applied to the processing of generating an interpolation frame image while extracting the motion vector information shown in FIG. 4.

Further, explained in Embodiment 3 is the processing of correcting a downsampled image signal in which two consecutive frame images are sampled from among eight frame images within one period of downsampling periods, that is, a downsampled image signal with a downsampling period of 2/8, and displaying the corrected image signal.

Figure 16:
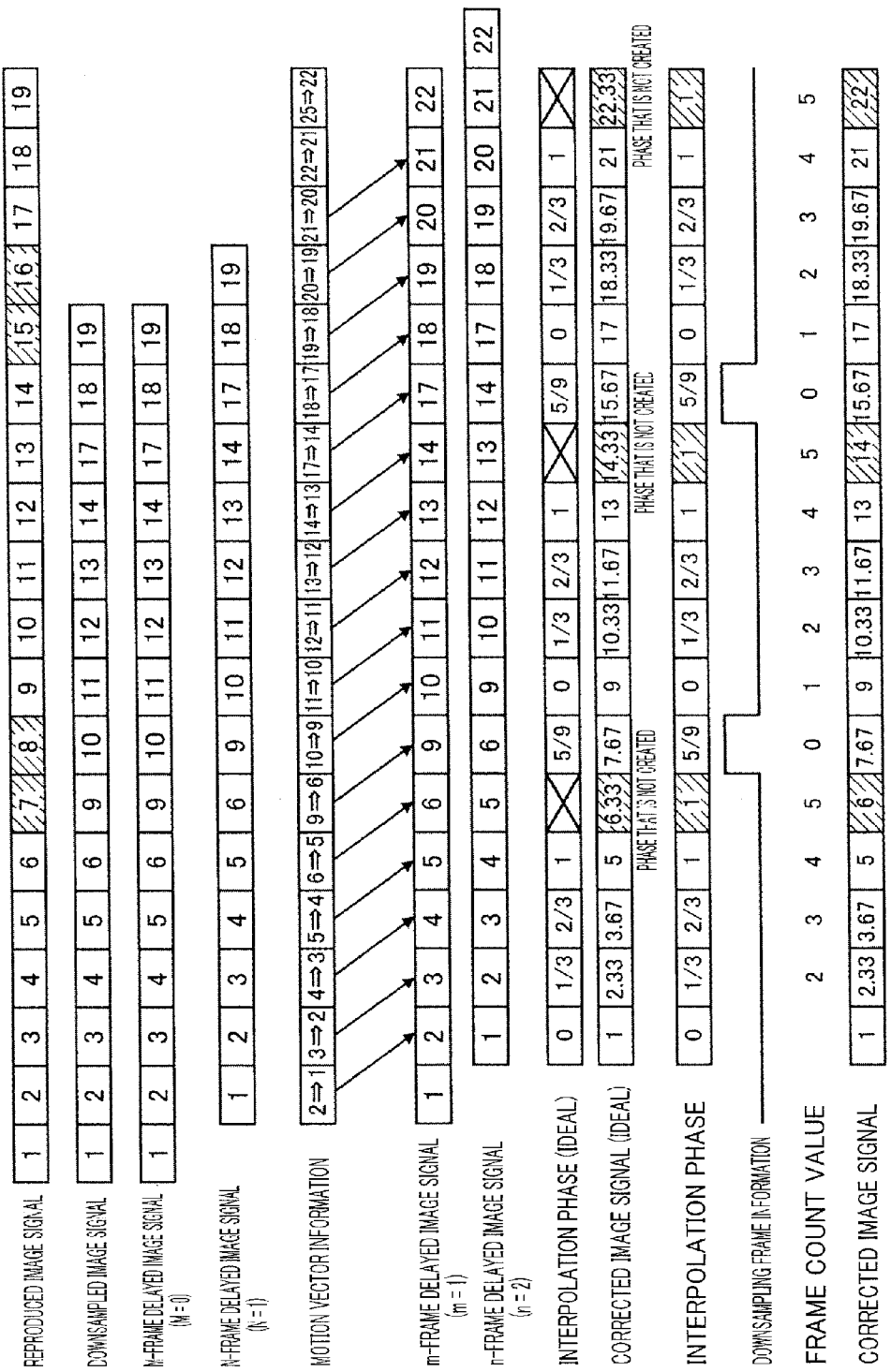
FIG. 16 is a timing chart for explaining the processing of correcting the downsampled image signal with a downsampling period of 2/8 in Embodiment 3.

FIG. 16 is a timing chart for explaining the processing of correcting the downsampled image signal with a downsampling period of 2/8 in Embodiment 3. The digits in the reproduced image signal, downsampled image signal, M-frame delayed image signal, N-frame delayed image signal, m-frame delayed image signal, and n-frame delayed image signal represent frame numbers.

Comparing with the case in which the downsampling frame information is acquired from the reproduction device, which is illustrated in FIG. 7, the reproduced image signal, downsampled image signal, M-frame delayed image signal, N-frame delayed image signal, m-frame delayed image signal, n-frame delayed image signal, and motion vector information are the same, but the downsampling timing of downsampling frame information is different.

In the processing of correcting the downsampled image signal with a downsampling period of 2/8, which is shown in FIG. 16, the phase of the pulse signal of the downsampling frame information is delayed by one frame in the same manner as in the processing of correcting the downsampled image signal with a downsampling period of 1/4, which is shown in FIG. 15.

Accordingly, in the example shown in FIG. 16, the correlation between the frame count value and interpolation phase is different from that in the example shown in FIG. 7. Thus, the interpolation phase "1/3" is associated with the frame count value "2", the interpolation phase "2/3" is associated with the frame count value "3", the interpolation phase "1" is associated with the frame count value "4", the interpolation phase "1" is associated with the frame count value "5", the interpolation phase "5/9" is associated with the frame count value "0", and the interpolation phase "0" is associated with the frame count value "1". The interpolation phase generator 215 selects the interpolation phase corresponding to the frame count value of the frame counter by referring to the table.

As a result, the corrected image signal can be obtained at a timing same as that in the case in which the downsampling frame information is acquired from the reproduction device shown in FIG. 7.

The processing of correcting a downsampled image signal with a downsampling period of 2/8 of Embodiment 3 can be similarly applied to the processing of Embodiment 2 illustrated by FIGS. 10 to 12.

Further, explained in Embodiment 3 is the processing of correcting a downsampled image signal in which one frame image is thinned from among three frame images within one period of downsampling periods, that is, a downsampled image signal with a downsampling period of 1/3, and displaying the corrected image signal.

Figure 17:
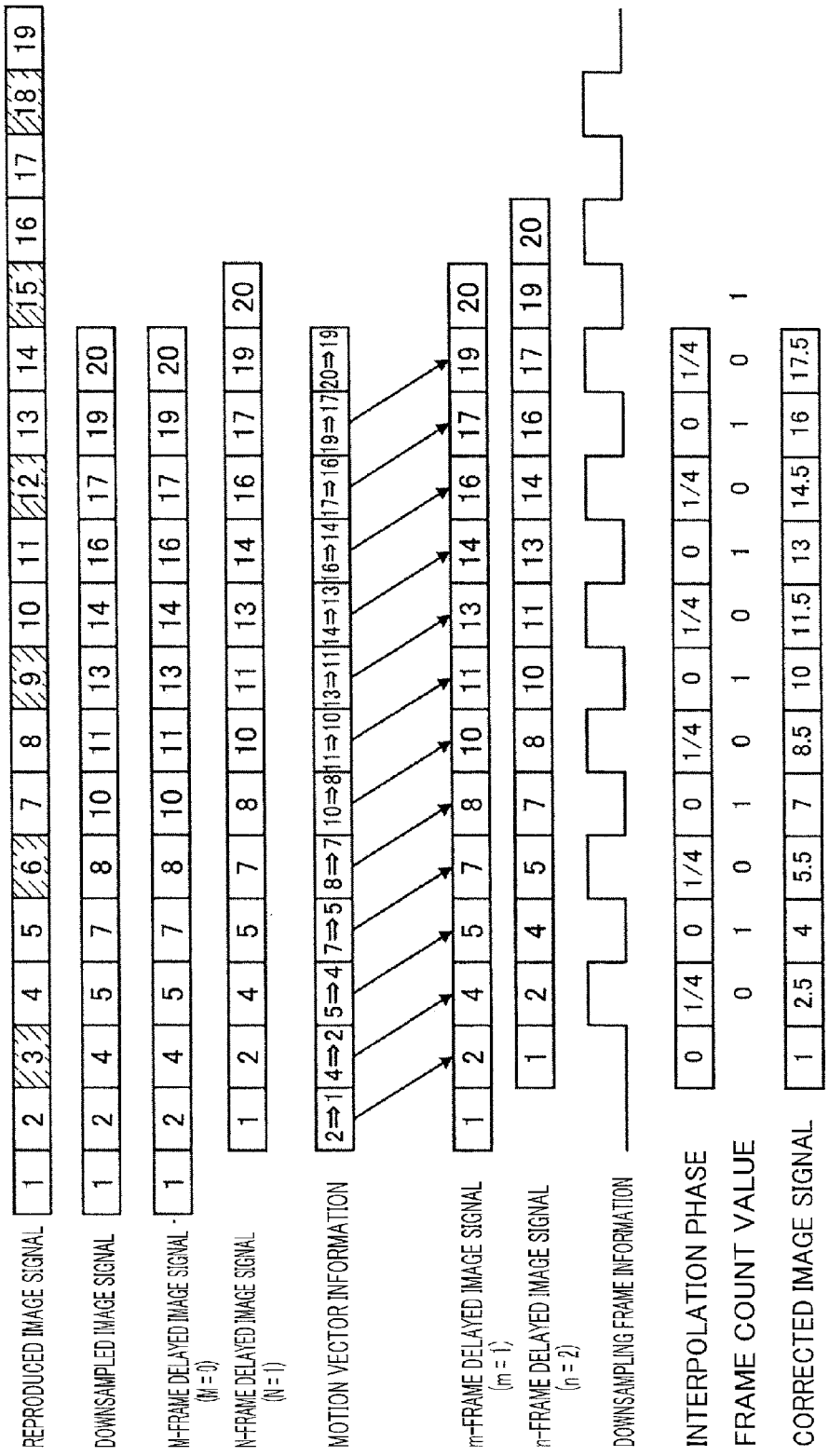
FIG. 17 is a timing chart for explaining the processing of correcting the downsampled image signal with a downsampling period of 1/3 in Embodiment 3.

FIG. 17 is a timing chart for explaining the processing of correcting the downsampled image signal with a downsampling period of 1/3 in Embodiment 3. The digits in the reproduced image signal, downsampled image signal, M-frame delayed image signal, N-frame delayed image signal, m-frame delayed image signal, and n-frame delayed image signal represent frame numbers.

Comparing with the case in which the downsampling frame information is acquired from the reproduction device, which is illustrated in FIG. 8, the reproduced image signal, downsampled image signal, M-frame delayed image signal, N-frame delayed image signal, m-frame delayed image signal, n-frame delayed image signal, and motion vector information are the same, but the downsampling timing of downsampling frame information is different.

In the processing of correcting the downsampled image signal with a downsampling period of 1/3 which is shown in FIG. 17, the phase of the pulse signal of the downsampling frame information is delayed by one frame in the same manner as in the processing of correcting the downsampled image signal with a downsampling period of 1/4, which is shown in FIG. 15.

Accordingly, in the example shown in FIG. 17, the correlation between the frame count value and interpolation phase is different from that in the example shown in FIG. 8. Thus, the interpolation phase "1/4" is associated with the frame count value "0", and the interpolation phase "0" is associated with the frame count value "1". The interpolation phase generator 215 selects the interpolation phase corresponding to the frame count value of the frame counter by referring to the table.

As a result, the corrected image signal can be obtained at a timing same as that in the case in which the downsampling frame information is acquired from the reproduction device shown in FIG. 8.

In Embodiment 3, the downsampling timing is automatically detected, but the downsampling timing at which next downsampling is to be performed can be predicted on the basis of detection results relating to the past downsampling timings. Accordingly, the downsampling detector 217 predicts the downsampling timing at which next downsampling is to be performed on the basis of the downsampling timing detected in the past. The downsampling detector 217 then further reduces the vector value determination threshold at the predicted downsampling timing. As a result, the detection leak of downsampling timing occurring when the motion amount at the downsampling timing has incidentally decreased can be reduced.

Embodiment 4

In some cases the downsampling timings for thinned frames can become equal to each other even when the periods for frame thinning, that is, the numbers of the thinned frames, differ from each other.

For example, in the downsampled image signal with a downsampling period of 1/4 and the downsampled image signal with a downsampling period of 2/5, the downsampling periods are different, but the downsampling timing for frame thinning is the same. For this reason, the correct interpolation phase sometimes cannot be generated when the interpolation phase is generated only on the basis of the downsampling timing.

Accordingly, in Embodiment 4, the interpolation phase generator generates the interpolation phases of the interpolation frame image on the basis of downsampling timing and the number of thinned frames.

Figure 18:
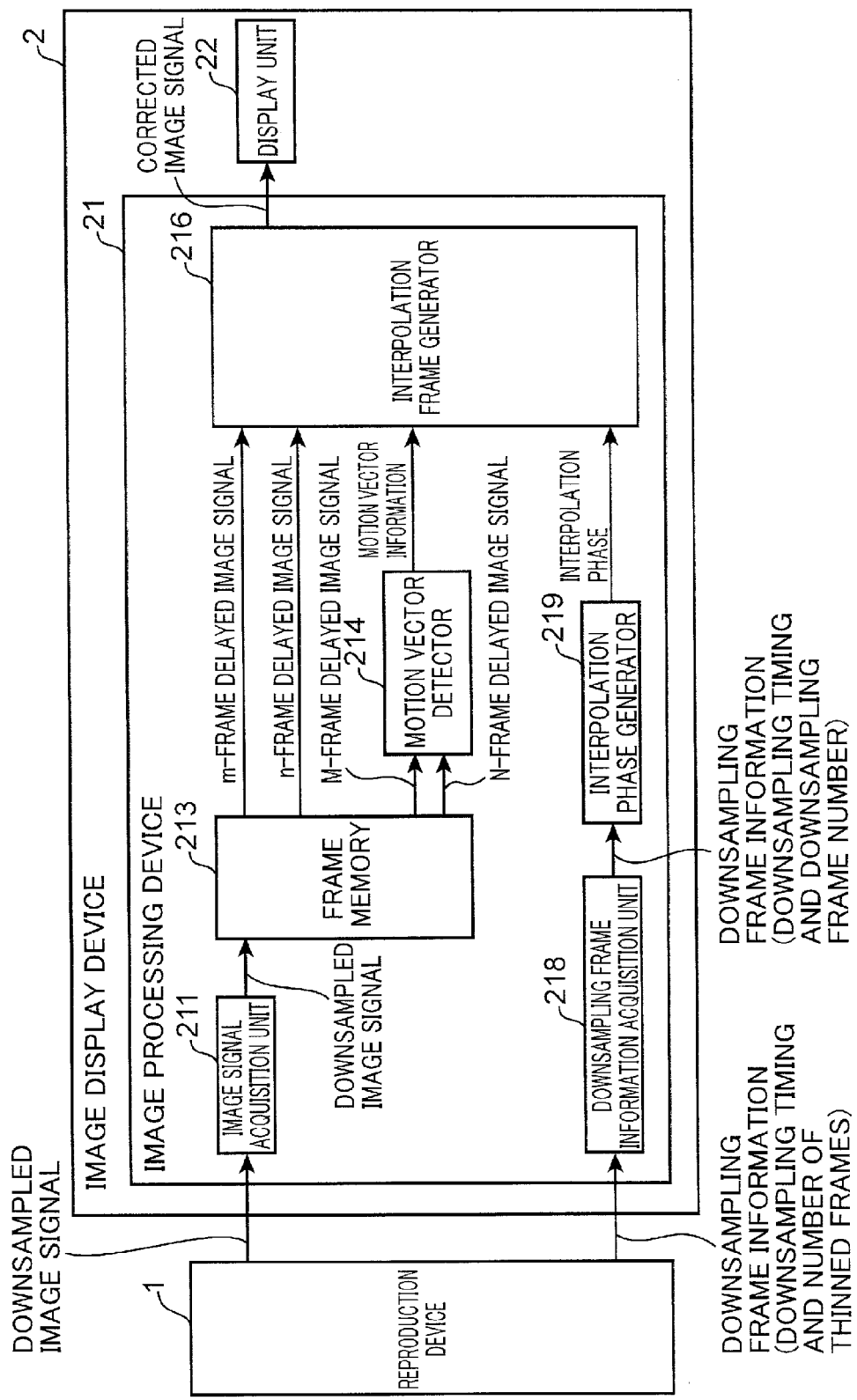
FIG. 18 illustrates the configuration of the image display device of Embodiment 4 of the present invention.

FIG. 18 illustrates the configuration of the image display device of Embodiment 4 of the present invention. The image display device 2 shown in FIG. 18 is provided with the image processing device 21 and the display unit 22. The image processing device 21 is provided with the image signal acquisition unit 211, the frame memory 213, the motion vector detector 214, the interpolation frame generator 216, a downsampling frame information acquisition unit 218, and an interpolation phase generator 219. In FIG. 18, the explanation of components same as those of the image display device of Embodiment 1 shown in FIG. 1 is omitted.

The downsampling frame information acquisition unit 218 acquires from the reproduction device 1 downsampling frame information representing the downsampling timing at which at least one frame image of the downsampled image signal acquired from the image signal acquisition unit 211 is sampled, and the number of thinned frames of the downsampled image signal. The downsampling frame information acquisition unit 218 outputs the acquired downsampling frame information to the interpolation phase generator 219.

The interpolation phase generator 219 generates the interpolation phase of the interpolation frame image that will be generated using two adjacent frame images from among a plurality of frame images, on the basis of the downsampling timing and the number of thinned frames contained in the downsampling frame information acquired from the downsampling frame information acquisition unit 218. The interpolation phase generator 219 generates the interpolation phase such that a phase distance between the leading first interpolation frame image from among a plurality of interpolation frame images within one period of downsampling periods in which at least one frame image is thinned from among the plurality of frame images, and the second interpolation frame image that follows the first interpolation frame image becomes equal to a phase distance between mutually adjacent interpolation frame images attained when phase distances between a plurality of interpolation frame images are equalized within one period of the downsampling periods.

The operation of the image display device 2 shown in FIG. 18 is explained below. Initially explained is the processing of correcting a downsampled image signal obtained by thinning one frame image from among four frame images within one period of downsampling periods, that is, the downsampled image signal with a downsampling period of 1/4, and displaying the corrected image signal.

Figure 19:
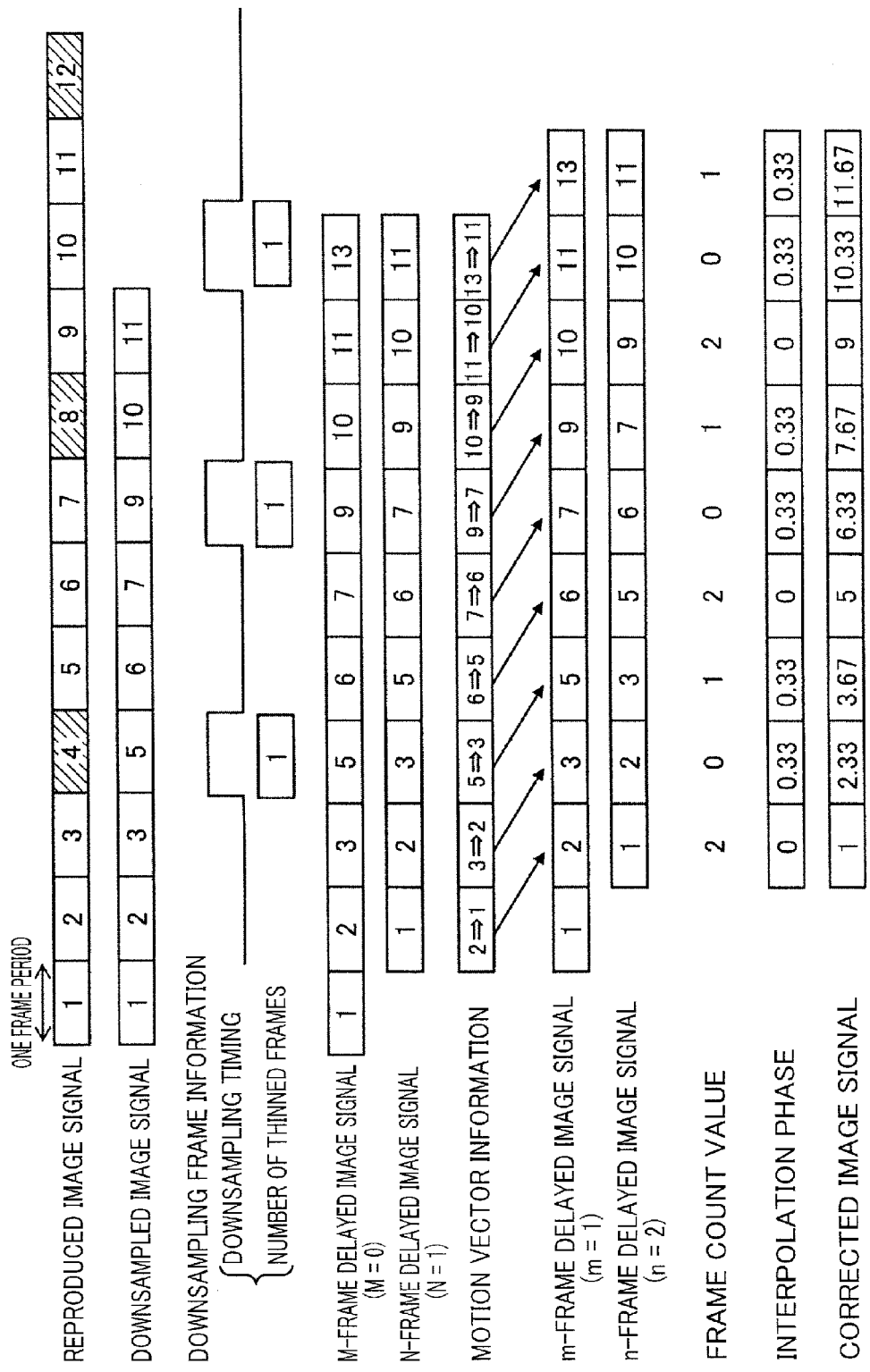
FIG. 19 is a timing chart for explaining the processing of correcting the downsampled image signal with a downsampling period of 1/4 in Embodiment 4.

FIG. 19 is a timing chart for explaining the processing of correcting the downsampled image signal with a downsampling period of 1/4 in Embodiment 4. The digits in the reproduced image signal, downsampled image signal, M-frame delayed image signal, N-frame delayed image signal, m-frame delayed image signal, and n-frame delayed image signal represent frame numbers.

The reproduced image signal shown in FIG. 19 represents a reproduced image signal reproduced by the reproduction device 1, and the downsampled image signal represents a downsampled image signal outputted from the reproduction device 1. The image signal acquisition unit 211 acquires an image signal in which one frame image from among four frame images has been sampled within one period of downsampling periods. In the downsampled image signal, frame images with frame numbers "4", "8", and "12" are omitted. Thus, the fourth frame image from among the first to fourth consecutive frame images within one period of downsampling periods is sampled.

The downsampling frame information represents downsampling frame information acquired by the downsampling frame information acquisition unit 218 and inputted to the interpolation phase generator 219. The downsampling frame information includes a pulse signal representing the downsampling timing at which the frame image has been thinned and the number of thinned frames representing the number of thinned frames at the downsampling timing. The downsampling timing has a high level "1" when a frame image has been thinned and a low level "0" when a frame image has not been thinned. The downsampling timings shown in FIG. 19 are timings at which frame images with frame numbers "5", "9", and "13" of the downsampled image signal are outputted, and those timings have a high level "1". The number of thinned frames is acquired together with the downsampling timing. When one frame image is thinned from among four frame images within one period of downsampling periods, as shown in FIG. 19, the number of thinned frames is "1".

The M-frame delayed image signal represents an image signal delayed, for example, by 0 frames, the N-frame delayed image signal represents an image signal delayed, for example, by 1 frame (M+1 frames), the m-frame delayed image signal represents an image signal delayed, for example, by 1 frame (M+1 frames), and the n-frame delayed image signal represents an image signal delayed, for example, by 2 frames (N+1 frames). The M-frame delayed image signal represents an image signal that has not been delayed and is identical to the downsampled image signal.

In the present embodiment, the interpolation frame image is generated after the motion vector information on one frame image has been entirely calculated. Therefore, the M-frame delayed image signal, N-frame delayed image signal, m-frame delayed image signal, and n-frame delayed image signal satisfy the conditions m=M+1 and n=N+1.

The motion vector information represents the frame number of the frame image for which the motion vector is to be calculated and the frame number of the frame image that is referred to when the motion vector is calculated. The motion vector detector 214 detects the motion vector by using the M-frame delayed image signal and the N-frame delayed image signal outputted from the frame memory 213.

The interpolation phase generator 219 includes a frame counter that counts the number of frame images after the frame image has been thinned. The frame count value that is counted by the frame counter changes correspondingly to the downsampling frame information. The frame count value is reset to 0 when the downsampling frame information has a high level "1", and incremented when the downsampling frame information has a low level "0".

The interpolation phase represents the position at which the interpolation frame image is generated between two adjacent images when the distance between the two adjacent images is taken as 1 within one frame period representing the period in which one frame image is displayed. The interpolation phase generator 219 specifies a downsampling mode on the basis of the frame count value and the number of thinned frames. The downsampling mode represents a downsampling ratio and indicates at which rate the image is reproduced. For example, where downsampling is performed with a period of 1/4 or 2/8, the downsampling mode is a mode with a rate increased by a factor of 1.33. For example, where downsampling is performed with a period of 1/3, the downsampling mode is a mode with a rate increased by a factor of 1.5. For example, where downsampling is performed with a period of 2/5, the downsampling mode is a mode with a rate increased by a factor of 1.67.

For example, when the maximum value of the frame count value is "2" and the number of thinned frames is "1", the interpolation phase generator 219 determines that the downsampling mode is a mode with a rate increased by a factor of 1.33 (downsampling period 1/4). When the maximum value of the frame count value is "2" and the number of thinned frames is "2", the interpolation phase generator 219 determines that the downsampling mode is a mode with a rate increased by a factor of 1.67. When the maximum value of the frame count value is "5" and the number of thinned frames is "2", the interpolation phase generator 219 determines that the downsampling mode is a mode with a rate increased by a factor of 1.33 (downsampling period 2/8). Further, when the maximum value of the frame count value is "1" and the number of thinned frames is "1", the interpolation phase generator 219 determines that the downsampling mode is a mode with a rate increased by a factor of 1.5.

A table in which the frame count values and the interpolation phases are associated with each other is stored in advance for each downsampling mode in the interpolation phase generator 219. When the downsampling mode is a mode with a rate increased by a factor of 1.33 (downsampling period 1/4), the interpolation phase "0" is associated with the frame count value "2", and the interpolation phase "0.33" is associated with the frame count value "1" and "0". The interpolation phase generator 219 refers to the table corresponding to the specified downsampling mode and selects the interpolation phase corresponding to the frame count value of the frame counter.

The corrected image signal represents the corrected output image signal including the interpolation frame image generated by the interpolation frame generator 216. As shown in FIG. 19, the interpolation frame generator 216 generates the interpolation frame image corresponding to the interpolation phase on the basis of the m-frame delayed image signal and n-frame delayed image signal outputted from the frame memory 213 and the motion vector detected by the motion vector detector 214.

Since the interpolation phase corresponding to the first interpolation frame image is "0", the first frame image of the n-frame delayed image signal is outputted as the first interpolation frame image. Since the interpolation phase corresponding to the second interpolation frame image is "0.33", the interpolation frame image at a position corresponding to "2.33" between the second frame image of the n-frame delayed image signal and the third frame image of the m-frame delayed image signal is outputted as the second interpolation frame image. Since the interpolation phase corresponding to the third interpolation frame is "0.33", the interpolation frame image at a position corresponding to "3.67" between the third frame image of the n-frame delayed image signal and the fifth frame image of the m-frame delayed image signal is outputted as the third interpolation frame image. The first to third interpolation frame images are outputted in each period.

Explained below is the processing of correcting a downsampled image signal obtained by thinning two consecutive frame images from among five frame images within one period of downsampling periods, that is, the downsampled image signal with a downsampling period of 2/5, and displaying the corrected image signal.

Figure 20:
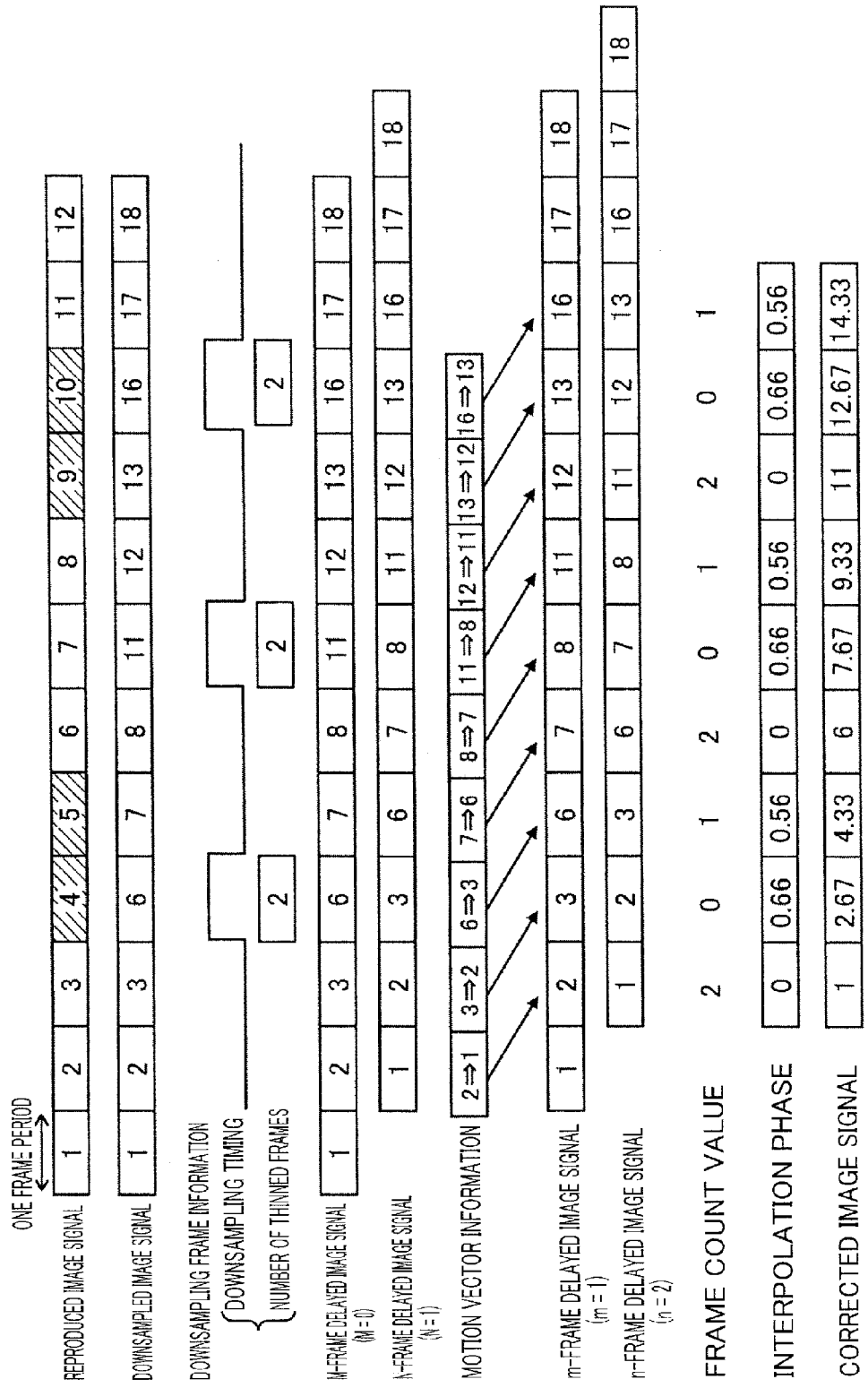
FIG. 20 is a timing chart for explaining the processing of correcting the downsampled image signal with a downsampling period of 2/5 in Embodiment 4.

FIG. 20 is a timing chart for explaining the processing of correcting the downsampled image signal with a downsampling period of 2/5 in Embodiment 4. The digits in the reproduced image signal, downsampled image signal, M-frame delayed image signal, N-frame delayed image signal, m-frame delayed image signal, and n-frame delayed image signal represent frame numbers.

The reproduced image signal shown in FIG. 20 represents a reproduced image signal reproduced by the reproduction device 1, and the downsampled image signal represents a downsampled image signal outputted from the reproduction device 1. The image signal acquisition unit 211 acquires an image signal in which two consecutive frame images from among five frame images have been sampled within one period of downsampling periods. In the downsampled image signal, frame images with frame numbers "4", "5", "9" and "10" are omitted. Thus, the fourth and fifth frame images from among the first to fifth consecutive frame images within one period of downsampling periods are sampled.

The downsampling frame information represents downsampling frame information acquired by the downsampling frame information acquisition unit 218 and inputted to the interpolation phase generator 219. The downsampling frame information includes a pulse signal representing the downsampling timing at which the frame image has been thinned and the number of thinned frames representing the number of frames that have been thinned at the downsampling timing. The downsampling timing has a high level "1" when a frame image has been thinned and a low level "0" when a frame image has not been thinned. The downsampling timings shown in FIG. 20 are timings at which frame images with frame numbers "6", "11", and "16" of the downsampled image signal are outputted, and those timings have a high level "1". The number of thinned frames is acquired together with the downsampling timing. When two consecutive frame images are sampled from among five frame images within one period of downsampling periods, as shown in FIG. 20, the number of thinned frames is "2".

The M-frame delayed image signal represents an image signal delayed, for example, by 0 frames, the N-frame delayed image signal represents an image signal delayed, for example, by 1 frame (M+1 frames), the m-frame delayed image signal represents an image signal delayed, for example, by 1 frame (M+1 frames), and the n-frame delayed image signal represents an image signal delayed, for example, by 2 frames (N+1 frames). The M-frame delayed image signal represents an image signal that has not been delayed and is identical to the downsampled image signal.

In the present embodiment, the interpolation frame image is generated after the motion vector information on one frame image has been entirely calculated. Therefore, the M-frame delayed image signal, N-frame delayed image signal, m-frame delayed image signal, and n-frame delayed image signal satisfy the conditions m=M+1 and n=N+1.

The motion vector information represents the frame number of the frame image for which the motion vector is to be calculated and the frame number of the frame image that is referred to when the motion vector is calculated. The motion vector detector 214 detects the motion vector by using the M-frame delayed image signal and the N-frame delayed image signal outputted from the frame memory 213.

The interpolation phase generator 219 includes a frame counter that counts the number of frame images after the frame image has been thinned. The frame count value that is counted by the frame counter changes correspondingly to the downsampling frame information. The frame count value is reset to 0 when the downsampling frame information has a high level "1", and incremented when the downsampling frame information has a low level "0".

The interpolation phase represents the position at which the interpolation frame image is generated between two adjacent images when the distance between the two adjacent images is taken as 1 within one frame period representing the period in which one frame image is displayed. The interpolation phase generator 219 specifies a downsampling mode on the basis of the frame count value and the number of thinned frames. For example, the interpolation phase generator 219 determines that a mode with a rate increased by a factor of 1.67 is realized when the maximum value of the frame count value is "2" and the number of thinned frames is "2".

A table in which the frame count values and the interpolation phases are associated with each other is stored in advance for each downsampling mode in the interpolation phase generator 219. When the downsampling mode is a mode with a rate increased by a factor of 1.67 (downsampling period 2/5), the interpolation phase "0" is associated with the frame count value "2", the interpolation phase "0.56" is associated with the frame count value "1", and the interpolation phase "0.66" is associated with the frame count value "0". The interpolation phase generator 219 refers to the table corresponding to the specified downsampling mode and selects the interpolation phase corresponding to the frame count value of the frame counter.

The corrected image signal represents the corrected output image signal including the interpolation frame image generated by the interpolation frame generator 216. As shown in FIG. 20, the interpolation frame generator 216 generates the interpolation frame image corresponding to the interpolation phase on the basis of the m-frame delayed image signal and n-frame delayed image signal outputted from the frame memory 213 and the motion vector detected by the motion vector detector 214.

Since the interpolation phase corresponding to the first interpolation frame image is "0", the first frame image of the n-frame delayed image signal is outputted as the first interpolation frame image. Since the interpolation phase corresponding to the second interpolation frame image is "0.66", the interpolation frame image at a position corresponding to "2.67" between the second frame image of the n-frame delayed image signal and the third frame image of the m-frame delayed image signal is outputted as the second interpolation frame image. Since the interpolation phase corresponding to the third interpolation frame is "0.56", the interpolation frame image at a position corresponding to "4.33" between the third frame image of the n-frame delayed image signal and the sixth frame image of the m-frame delayed image signal is outputted as the third interpolation frame image. The first to third interpolation frame images are outputted in each period.

As described hereinabove, in the mode with a rate increased by a factor of 1.33 which has a downsampling period of 1/4 shown in FIG. 19 and the mode with a rate increased by a factor of 1.67 which has a downsampling period of 2/5 shown in FIG. 20, the downsampling timing is the same. In other words, even though the downsampling periods differ from each other, the downsampling timings are equal to each other. Therefore, the interpolation phase cannot be specified on the basis of only the frame count value.

Meanwhile in Embodiment 4, the interpolation phase can be specified on the basis of downsampling timing and the number of thinned frames.

In Embodiment 4, the downsampling frame information acquisition unit 218 acquires the number of thinned frames together with the downsampling timing, but the present invention is not limited to such a configuration, and the number of thinned frames may be acquired only at a timing at which the number of thinned frames changes, that is, when the operation state changes.

In Embodiment 4, the case is explained in which the downsampling period is 1/4 and 2/5, but the present invention is not limited to such a configuration and may be applied to other downsampling periods, for example, such as 2/8 and 1/3. Further, the downsampling frame information shown in Embodiment 4 may be also used in Embodiment 2.

Embodiment 5

In Embodiment 5, similarly to Embodiment 3, the timings at which frame images are thinned are detected and the downsampling timing is created on the basis of the motion vector detector by the motion vector detector, rather than by acquiring the downsampling timing from the reproduction device. Further, in Embodiment 5, the number of thinned frames is acquired from the reproduction device.

Figure 21:
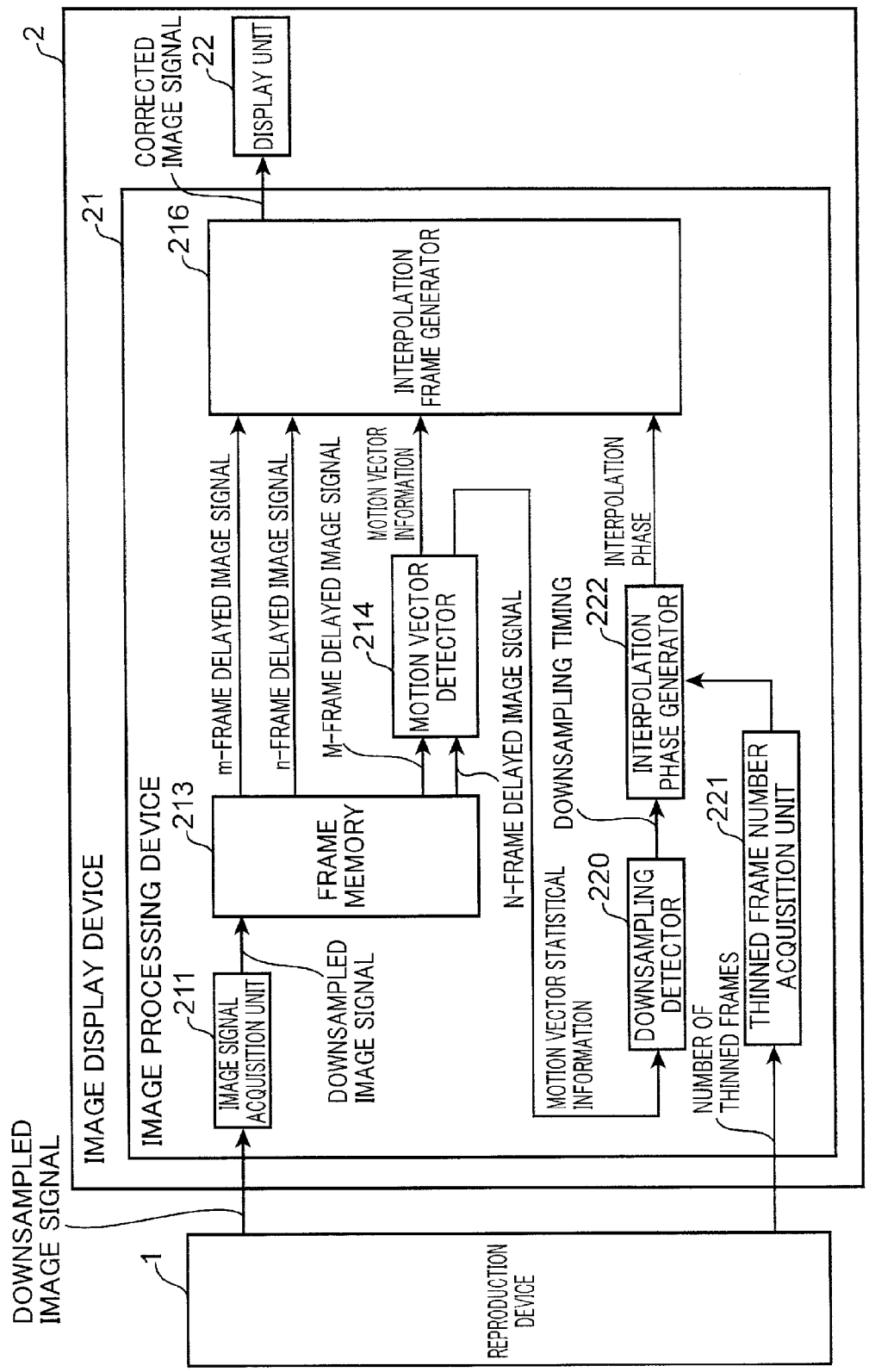
FIG. 21 illustrates the configuration of the image display device of Embodiment 5 of the present invention.

FIG. 21 illustrates the configuration of the image display device of Embodiment 5 of the present invention. The image display device 2 shown in FIG. 21 is provided with the image processing device 21 and the display unit 22. The image processing device 21 is provided with the image signal acquisition unit 211, the frame memory 213, the motion vector detector 214, the interpolation frame generator 216, a downsampling detector 220, a thinned frame number acquisition unit 221, and an interpolation phase generator 222. In FIG. 21, the explanation of components same as those of the image display device of Embodiment 3 shown in FIG. 13 is omitted.

The downsampling detector 220 determines whether or not the motion vector statistical information outputted from the motion vector detector 214 is greater than a predetermined threshold, generates a high-level pulse signal when the motion vector statistical information is determined to be greater than the predetermined threshold, generates a low-level pulse signal when the motion vector statistical information is determined to be equal to or lower than the predetermined threshold, and outputs the generated pulse signals as downsampling timings to the interpolation phase generator 222.

The processing of producing downsampling timings from the motion vector information is the same as in Embodiment 3 and the explanation thereof is herein omitted.

The thinned frame number acquisition unit 221 acquires from the reproduction device 1 information representing the number of thinned frames in the downsampled image signal. The thinned frame number acquisition unit 221 outputs the acquired number of thinned frames to the interpolation phase generator 222. The thinned frame number acquisition unit 221 acquires the number of thinned frames when the number of thinned frames changes, that is, when the operation state changes.

The interpolation phase generator 222 generates the interpolation phase of interpolation frame image that is generated by using two adjacent frame images from among a plurality of frame images on the basis of the downsampling timing detected by the downsampling detector 220 and the number of thinned frames acquired by the thinned frame number acquisition unit 221.

The operation of the image display device 2 shown in FIG. 21 is explained below. Initially explained is the processing of correcting a downsampled image signal obtained by thinning two consecutive frame images from among five frame images within one period of downsampling periods, that is, the downsampled image signal with a downsampling period of 2/5, and displaying the corrected image signal in Embodiment 5.

Figure 22:
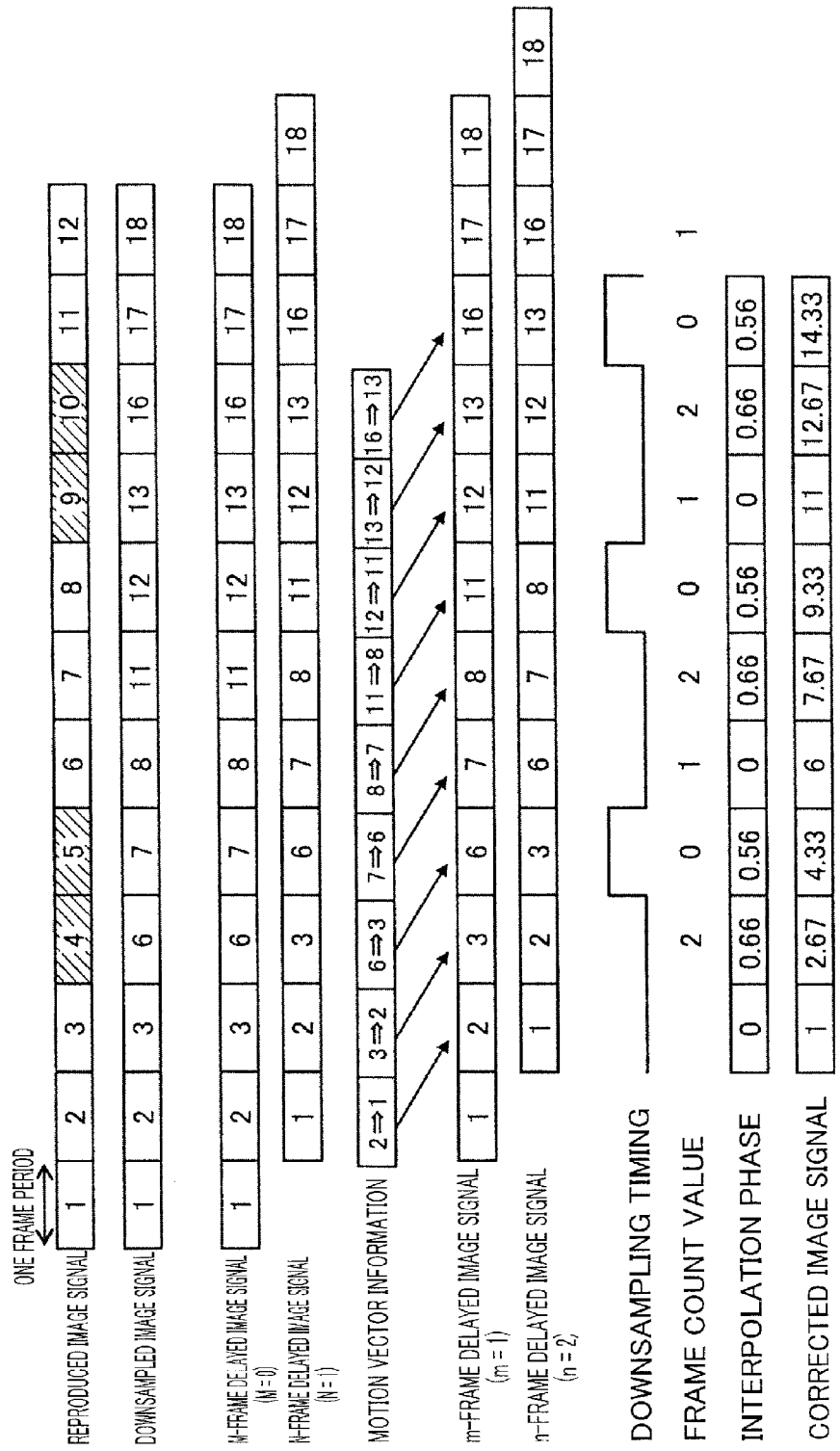
FIG. 22 is a timing chart for explaining the processing of correcting the downsampled image signal with a downsampling period of 2/5 in Embodiment 5.

FIG. 22 is a timing chart for explaining the processing of correcting the downsampled image signal with a downsampling period of 2/5 in Embodiment 5. The digits in the reproduced image signal, downsampled image signal, M-frame delayed image signal, N-frame delayed image signal, m-frame delayed image signal, and n-frame delayed image signal represent frame numbers.

Comparing with the case in which the downsampling frame information is acquired from the reproduction device, which is illustrated in FIG. 20, the reproduced image signal, downsampled image signal, M-frame delayed image signal, N-frame delayed image signal, m-frame delayed image signal, n-frame delayed image signal, and motion vector information are the same, but the downsampling timing of downsampling frame information is different. The number of thinned frames is acquired by the thinned frame number acquisition unit 221.

The interpolation phase generator 222 specifies the downsampling mode on the basis of the frame count value and the number of thinned frames. For example, the interpolation phase generator 222 determines that a mode with a rate increased by a factor of 1.67 is realized, when the maximum value of the frame count value is "2" and the number of thinned frames is "2".

When a downsampling timing is produced from the motion vector information, as shown in FIG. 22, the downsampling timing is detected after the motion vector information has been detected. Therefore, the phase of the pulse signal of downsampling timing is delayed by one frame by comparison with the case in which the downsampling timing is acquired from the reproduction device.

Accordingly, in the example shown in FIG. 22, the correlation between the frame count value and interpolation phase is different from that of the example shown in FIG. 20. Thus, when the downsampling mode is a mode with the rate increased by a factor of 1.67 (downsampling period 2/5), the interpolation phase "0" is associated with the frame count value "1", the interpolation phase "0.66" is associated with the frame count value "2", and the interpolation phase "0.56" is associated with the frame count value "0". The interpolation phase generator 222 selects the interpolation phase corresponding to the frame count value of the frame counter by referring to the table corresponding to the specified downsampling mode.

As a result, the corrected image signal can be obtained at the same timing as that in the case in which the downsampling frame information is acquired from the reproduction device shown in FIG. 20.

In Embodiment 5, the case is explained in which the downsampling period is 2/5, but the present invention is not particularly limited to such a configuration and may be also applied to other downsampling periods, for example, such as 1/4, 2/8, and 1/3.

In Embodiments 1 to 5, the image display device and reproduction device are provided independently from each other, but the present invention is not limited to such a configuration, and the image display device may include the reproduction device, or the reproduction device may include the image processing device. Further, the image display device can be also used in a liquid crystal display device, a plasma display device, and an organic EL display device, and the reproduction device can be used in an optical disk player and an optical disk recorder.

The above-described specific embodiments mainly include the invention having the following features.

An image display device according to one aspect of the present invention includes: an image signal acquirer that acquires an image signal in which at least one frame image has been periodically thinned from among a plurality of temporally consecutive frame images; a motion vector detector that detects a motion vector of the present frame image by using at least two or more temporally adjacent frame images; an interpolation phase generator that generates an interpolation phase of an interpolation frame image on the basis of downsampling frame information representing a downsampling timing at which the at least one frame image of the image signal acquired by the image signal acquirer is thinned; an interpolation frame generator that generates an interpolation frame image corresponding to the interpolation phase generated by the interpolation phase generator, on the basis of the image signal acquired by the image signal acquirer and the motion vector detected by the motion vector detector; and a display that displays an image signal including the interpolation frame image generated by the interpolation frame generator, wherein the interpolation phase generator generates the interpolation phase such that a phase distance between a first interpolation frame image from among a plurality of interpolation frame images within one period of downsampling periods in which at least one frame image is thinned from among the plurality of frame images, and a second interpolation frame image that follows the first interpolation frame image becomes equal to a phase distance between mutually adjacent interpolation frame images obtained when phase distances between a plurality of interpolation frame images are equalized within one period of the downsampling periods.

With such a configuration, the image signal in which at least one frame image has been periodically thinned from a plurality of temporally consecutive frame images is acquired by the image signal acquirer. The motion vector of the present frame image is detected by the motion vector detector by using at least two or more temporally adjacent frame images. The interpolation phase of an interpolation frame image is generated by the interpolation phase generator on the basis of downsampling frame information representing a downsampling timing at which the at least one frame image of the acquired image signal is sampled. The interpolation frame image corresponding to the generated interpolation phase is generated by the interpolation frame generator on the basis of the acquired image signal and the detected motion vector. The image signal including the generated interpolation frame image is displayed by the display. The interpolation phase is generated by the interpolation phase generator such that a phase distance between the first interpolation frame image from among a plurality of interpolation frame images within one period of downsampling periods in which at least one frame image is thinned from among the plurality of frame images, and the second interpolation frame image that follows the first interpolation frame image becomes equal to a phase distance between mutually adjacent interpolation frame images attained when phase distances between a plurality of interpolation frame images are equalized within one period of the downsampling periods.

Therefore, a phase distance between the first interpolation frame image from among a plurality of interpolation frame images within one period of downsampling periods, and the second interpolation frame image that follows the first interpolation frame image becomes equal to a phase distance between mutually adjacent interpolation frame images attained when phase distances between a plurality of interpolation frame images are equalized within one period of the downsampling periods. As a result, the first interpolation frame image and the second interpolation frame image are displayed consecutively, the motion of the image can be smoothed, and a sense of visual discomfort can be improved.

Further, it is preferred that in the image display device, the image signal acquirer acquire an image signal in which one frame image is thinned from among four frame images within one period of the downsampling periods; and the interpolation phase generator generate the interpolation phase so as to equalize phase distances between three interpolation frame images within one period of the downsampling periods.

With such a configuration, an image signal in which one frame image is thinned from among four frame images within one period of the downsampling periods is acquired by the image signal acquirer. Further, the interpolation phase such as to equalize phase distances between three interpolation frame images within one period of the downsampling periods is generated by the interpolation phase generator.

Therefore, when an image signal in which one frame image is thinned from among four frame images within one period of the downsampling periods is acquired, the phase distances between three interpolation frame images within one period of the downsampling periods are equalized. As a result, the interpolation frame image is consecutively displayed, the motion of the image can be smoothed and a sense of visual discomfort can be improved.

Further, it is preferred that in the image display device, the image signal acquirer acquire an image signal in which two consecutive frame images are thinned from among eight frame images within one period of the downsampling periods; and the interpolation frame generator, when the interpolation frame image is not generated from mutually adjacent frame images, select from the image signal a frame image closest to the interpolation frame image to be generated and uses the selected frame image as the interpolation frame image.

With such a configuration, an image signal in which two consecutive frame images are thinned from among eight frame images within one period of the downsampling periods is acquired by the image signal acquirer. Further, when the interpolation frame image is not generated from mutually adjacent frame images, a frame image that is the closest to the interpolation frame image that should be generated is selected from the image signal and the selected frame image is generated as the interpolation frame image by the interpolation frame generator.

Therefore, the interpolation frame image can be generated even when the interpolation frame image is not generated from mutually adjacent frame images.

Further, it is preferred that in the image display device, the image signal acquirer acquire an image signal in which two consecutive frame images are thinned from among eight frame images within one period of the downsampling periods; and the interpolation frame generator, when the interpolation frame image is not generated from mutually adjacent frame images, generate the interpolation frame image by using mutually adjacent frame images that are next to the mutually adjacent frame images.

With such a configuration, an image signal in which two consecutive frame images are thinned from among eight frame images within one period of the downsampling periods is acquired by the image signal acquirer. Further, when the interpolation frame image is not generated from mutually adjacent frame images, the interpolation frame image is generated by the interpolation frame generator by using mutually adjacent frame images that are next to the mutually adjacent frame images.

Therefore, even when the interpolation frame image is not generated from mutually adjacent frame images, the interpolation frame image is generated by using mutually adjacent frame images that are next to the mutually adjacent frame images. Therefore, the motion of the image can be smoothed even better.

Further, it is preferred that in the image display device, the motion vector detector detect the motion vector on the basis of a frame image that is not delayed with respect to the image signal and a frame image that is delayed by one frame with respect to the image signal, and detect the motion vector on the basis of a frame image that is delayed by one frame with respect to the image signal and a frame image delayed by two frames with respect to the image signal, at the downsampling timing at which at least one frame image specified by the downsampling frame information has been thinned.

With such a configuration, the motion vector is detected by the motion vector detector on the basis of a frame image that is not delayed with respect to the image signal and a frame image that is delayed by one frame with respect to the image signal. Further, the motion vector is detected by the motion vector detector on the basis of a frame image that is delayed by one frame with respect to the image signal and a frame image delayed by two frames with respect to the image signal, at the downsampling timing at which at least one frame image specified by the downsampling frame information has been thinned.

Therefore, mutually adjacent frame images that are used for detecting the motion vector when a frame image is thinned and mutually adjacent frame images that are used for detecting the motion vector before the frame image is thinned become the same, and the motion vector is detected consecutively twice on the basis of identical mutually adjacent frame images. As a result, the detection accuracy of the second motion vector can be increased by detecting the second motion vector by using the detection result obtained for the first motion vector.

Further, it is preferred that in the image display device, the image signal acquirer acquire an image signal in which one frame image has been thinned from among three frame images within one period of downsampling periods.

With such a configuration, an image signal in which one frame image has been thinned from among three frame images within one period of downsampling periods is acquired by the image signal acquirer.

Therefore, even when the image signal in which one frame image has been thinned from three frame images within one period of downsampling periods is acquired, the interpolation frame images are consecutively displayed, the motion of the image can be smoothed, and a sense of visual discomfort can be improved.

Further, it is preferred that the image display device further include a downsampling frame information detector that calculates an average value, in each frame image, of the motion vector detected by the motion vector detector and detects the downsampling frame information on the basis of the calculated average value.

With such a configuration, the average value, in each frame image, of the motion vector is calculated and the downsampling frame information is detected on the basis of the calculated average value by the downsampling frame information detector.

Therefore, the downsampling frame information can be detected from the inputted image signal even when the downsampling frame information cannot be acquired from outside.

Further, it is preferred that in the image display device, the downsampling frame information further include the number of thinned frames of the image signal that is acquired by the image signal acquirer; and the interpolation phase generator generate an interpolation phase of an interpolation frame image on the basis of the downsampling timing and the number of thinned frames.

With such a configuration, the interpolation phase of an interpolation frame image is generated on the basis of the downsampling timing and the number of thinned frames. Therefore, the downsampling period can be specified on the basis of the number of thinned frames when the downsampling timing is the same, even when the downsampling periods are different.

An image processing device according to another aspect of the present invention includes: an image signal acquirer that acquires an image signal in which at least one frame image has been periodically thinned from among a plurality of temporally consecutive frame images; a motion vector detector that detects a motion vector of the present frame image by using at least two or more temporally adjacent frame images; an interpolation phase generator that generates an interpolation phase of an interpolation frame image generated in use of two adjacent frame images from among the plurality of frame images on the basis of downsampling frame information representing a downsampling timing at which the at least one frame image of the image signal acquired by the image signal acquirer is thinned; and an interpolation frame generator that generates an interpolation frame image corresponding to the interpolation phase generated by the interpolation phase generator, on the basis of the image signal acquired by the image signal acquirer and the motion vector detected by the motion vector detector, wherein the interpolation phase generator generates the interpolation phase such that a phase distance between a leading first interpolation frame image from among a plurality of interpolation frame images within one period of downsampling periods, and a second interpolation frame image that follows the first interpolation frame image becomes equal to a phase distance between mutually adjacent interpolation frame images obtained when phase distances between a plurality of interpolation frame images are equalized within one period of the downsampling periods.

With such a configuration, an image signal in which at least one frame image has been periodically thinned from among a plurality of temporally consecutive frame images is acquired by the image signal acquirer. A motion vector of the present frame image is detected using at least two or more temporally adjacent frame images by the motion vector detector. the interpolation phase generator generates an interpolation phase of an interpolation frame image, which is generated in use of two adjacent frame images from among the plurality of frame images, on the basis of downsampling frame information representing a downsampling timing at which the at least one frame image of the acquired image signal is thinned. An interpolation frame image corresponding to the generated interpolation phase is generated by the interpolation frame generator on the basis of the acquired image signal and detected the motion vector. The interpolation phase such that a phase distance between a leading first interpolation frame image from among a plurality of interpolation frame images within one period of downsampling periods and a second interpolation frame image that follows the first interpolation frame image becomes equal to a phase distance between mutually adjacent interpolation frame images attained when phase distances between a plurality of interpolation frame images are equalized within one period of the downsampling periods is generated by the interpolation phase generator.

Therefore, since a phase distance between a leading first interpolation frame image from among a plurality of interpolation frame images within one period of downsampling periods and a second interpolation frame image that follows the first interpolation frame image becomes equal to a phase distance between mutually adjacent interpolation frame images attained when phase distances between a plurality of interpolation frame images are equalized within one period of the downsampling periods, the first interpolation frame image and the second interpolation frame image are consecutively displayed, the motion of the image can be smoothed, and a sense of visual discomfort can be improved.

Specific embodiments or examples illustrating the implementation modes of the invention have been described for the sole purpose of clarifying the technical contents of the present invention, and the present invention should not be interpreted narrowly only to such specific examples. Rather, various modifications may be made without departing from the spirit of the invention and from the scope of the claims.

INDUSTRIAL APPLICABILITY

The image display device and image processing device in accordance with the present invention are useful as an image display device and an image processing device that can smooth the motion of the image, improve a sense of visual discomfort, and correct an image signal in which at least one frame image has been periodically thinned from among a plurality of temporally consecutive frame images.

The invention claimed is:

1. An image display device comprising:
an image signal acquirer that acquires an image signal in which at least one frame image has been periodically thinned from among a plurality of temporally consecutive frame images;
a motion vector detector that detects a motion vector of the present frame image by using at least two or more temporally adjacent frame images;
an interpolation phase generator that generates an interpolation phase of an interpolation frame image on the basis of downsampling frame information representing a downsampling timing at which the at least one frame image of the image signal acquired by the image signal acquirer is thinned;
an interpolation frame generator that generates an interpolation frame image corresponding to the interpolation phase generated by the interpolation phase generator, on the basis of the image signal acquired by the image signal acquirer and the motion vector detected by the motion vector detector; and
a display that displays an image signal including the interpolation frame image generated by the interpolation frame generator, wherein
the interpolation phase generator generates the interpolation phase such that a phase distance between a first interpolation frame image from among a plurality of interpolation frame images within one period of downsampling periods in which at least one frame image is thinned from among the plurality of frame images, and a second interpolation frame image that follows the first interpolation frame image becomes equal to a phase distance between mutually adjacent interpolation frame images obtained when phase distances between a plurality of interpolation frame images are equalized within one period of the downsampling periods.

2. The image display device according to claim 1, wherein the image signal acquirer acquires an image signal in which one frame image is thinned from among four frame images within one period of the downsampling periods; and the interpolation phase generator generates the interpolation phase so as to equalize phase distances between three interpolation frame images within one period of the downsampling periods.

3. The image display device according to claim 1, wherein the image signal acquirer acquires an image signal in which two consecutive frame images are thinned from among eight frame images within one period of the downsampling periods; and the interpolation frame generator, when the interpolation frame image is not generated from mutually adjacent frame images, selects from the image signal a frame image that is closest to the interpolation frame image to be generated and uses the selected frame image as the interpolation frame image.

4. The image display device according to claim 1, wherein the image signal acquirer acquires an image signal in which two consecutive frame images are thinned from among eight frame images within one period of the downsampling periods; and the interpolation frame generator, when the interpolation frame image is not generated from mutually adjacent frame images, generates the interpolation frame image by using mutually adjacent frame images that are next to the mutually adjacent frame images.

5. The image display device according to claim 4, wherein the motion vector detector detects the motion vector on the basis of a frame image that is not delayed with respect to the image signal and a frame image that is delayed by one frame with respect to the image signal, and detects the motion vector on the basis of a frame image that is delayed by one frame with respect to the image signal and a frame image delayed by two frames with respect to the image signal, at the downsampling timing at which at least a frame image specified by the downsampling frame information has been thinned.

6. The image display device according to claim 1, wherein the image signal acquirer acquires an image signal in which one frame image has been thinned from among three frame images within one period of downsampling periods.

7. The image display device according to claim 1, further comprising a downsampling frame information detector that calculates an average value, in each frame image, of the motion vector detected by the motion vector detector and detects the downsampling frame information on the basis of the calculated average value.

8. The image display device according to claim 1, wherein the downsampling frame information further includes the number of thinned frames of the image signal that is acquired by the image signal acquirer; and the interpolation phase generator generates an interpolation phase of an interpolation frame image on the basis of the downsampling timing and the number of thinned frames.

9. An image processing device comprising:

an image signal acquirer that acquires an image signal in which at least one frame image has been periodically thinned from among a plurality of temporally consecutive frame images;

a motion vector detector that detects a motion vector of the present frame image by using at least two or more temporally adjacent frame images;

an interpolation phase generator that generates an interpolation phase of an interpolation frame image on the basis of downsampling frame information representing a downsampling timing at which the at least one frame image of the image signal acquired by the image signal acquirer is thinned; and an interpolation frame generator that generates an interpolation frame image corresponding to the interpolation phase generated by the interpolation phase generator, on the basis of the image signal acquired by the image signal acquirer and the motion vector detected by the motion vector detector, wherein the interpolation phase generator generates the interpolation phase such that a phase distance between a first interpolation frame image from among a plurality of interpolation frame images within one period of downsampling periods in which at least one frame image is thinned from among the plurality of frame images, and a second interpolation frame image that follows the first interpolation frame image becomes equal to a phase distance between mutually adjacent interpolation frame images obtained when phase distances between a plurality of interpolation frame images are equalized within one period of the downsampling periods.

* * * * *